US010153873B2

(12) United States Patent
Seok

(10) Patent No.: US 10,153,873 B2
(45) Date of Patent: *Dec. 11, 2018

(54) PHYSICAL LAYER PROTOCOL DATA UNIT FORMAT APPLIED WITH SPACE TIME BLOCK CODING IN A HIGH EFFICIENCY WIRELESS LAN

(71) Applicant: NEWRACOM, INC., Irvine, CA (US)

(72) Inventor: Yongho Seok, Irvine, CA (US)

(73) Assignee: NEWRACOM, INC., Lake Forest, CA (US)

( * ) Notice: Subject to any disclaimer, the term of this patent is extended or adjusted under 35 U.S.C. 154(b) by 152 days.

This patent is subject to a terminal disclaimer.

(21) Appl. No.: 14/831,614

(22) Filed: Aug. 20, 2015

(65) Prior Publication Data

US 2016/0056930 A1 Feb. 25, 2016

(30) Foreign Application Priority Data

Aug. 20, 2014 (KR) .................. 10-2014-0108177

(51) Int. Cl.
*H04L 5/00* (2006.01)
*H04L 1/06* (2006.01)
*H04L 1/00* (2006.01)
*H04W 84/12* (2009.01)
*H04B 7/0452* (2017.01)
*H04B 7/06* (2006.01)

(52) U.S. Cl.
CPC .......... *H04L 5/0026* (2013.01); *H04L 1/0643* (2013.01); *H04L 5/005* (2013.01); *H04L 5/0044* (2013.01); *H04B 7/0452* (2013.01); *H04B 7/0669* (2013.01); *H04L 2001/0093* (2013.01); *H04W 84/12* (2013.01)

(58) Field of Classification Search
CPC ..................................................... H04L 5/0026
See application file for complete search history.

(56) References Cited

U.S. PATENT DOCUMENTS

| | | | | |
|---|---|---|---|---|
| 8,576,765 B2 * | 11/2013 | Shimada | ................ | H04B 7/024 370/315 |
| 8,634,317 B1 * | 1/2014 | Yu | ........................... | H04L 47/10 370/252 |
| 8,743,847 B2 * | 6/2014 | Seok | ................ | H04W 74/0816 370/336 |
| 9,203,586 B2 * | 12/2015 | You | ......................... | H04B 7/04 |

(Continued)

*Primary Examiner* — Parth Patel

(57) ABSTRACT

The present invention relates to a method and apparatus for transmitting and receiving signals using a Physical layer Protocol Data unit (PPDU) format to which Space-Time Block Coding (STBC) is applied in a Wireless Local Area Network (WLAN). According to one aspect of the present invention, a method for transmitting data to a plurality of Stations (STAs) on a transmission channel by an Access Point (AP) in a WLAN may be provided. The transmission channel may be divided into a plurality of subchannels allocated to the plurality of STAs. The method may include generating a High Efficiency-Long Training Field (HE-LTF) field having a length determined based on whether Space-Time Block Coding (STBC) is applied to the plurality of subchannels, and transmitting a Physical layer Protocol Data Unit (PPDU) frame including the HE-LTF field and a plurality of data units for the plurality of STAs to the plurality of STAs.

19 Claims, 22 Drawing Sheets

(56) References Cited

U.S. PATENT DOCUMENTS

| | | | |
|---|---|---|---|
| 9,374,254 B1* | 6/2016 | Kobatake | |
| 9,559,810 B2* | 1/2017 | Tetzlaff | H04L 1/0031 |
| 9,596,715 B1* | 3/2017 | Zhang | H04M 27/2647 |
| 9,819,460 B2* | 11/2017 | Seok | H04L 5/003 |
| 2006/0218459 A1* | 9/2006 | Hedberg | H03M 13/1102 714/752 |
| 2008/0238775 A1* | 10/2008 | Guo | H04B 7/0417 342/377 |
| 2009/0067533 A1* | 3/2009 | Yuan | H04B 7/0697 375/267 |
| 2009/0086706 A1* | 4/2009 | Huang | H04L 1/0026 370/349 |
| 2009/0298508 A1* | 12/2009 | Raju | H04W 72/1263 455/450 |
| 2010/0260159 A1* | 10/2010 | Zhang | H04W 28/06 370/338 |
| 2010/0309834 A1* | 12/2010 | Fischer | H04B 7/0452 370/312 |
| 2011/0002219 A1* | 1/2011 | Kim | H04B 7/0417 370/203 |
| 2011/0096796 A1* | 4/2011 | Zhang | H04B 7/0669 370/474 |
| 2011/0142153 A1* | 6/2011 | Yoon | H04B 7/0854 375/267 |
| 2011/0255434 A1* | 10/2011 | Ylitalo | H01Q 1/246 370/252 |
| 2011/0261812 A1* | 10/2011 | Kini | H04L 12/4633 370/389 |
| 2012/0020261 A1* | 1/2012 | Van Zelst | H04L 5/003 370/310 |
| 2012/0069830 A1* | 3/2012 | Shi | H04L 1/0057 370/338 |
| 2012/0106575 A1* | 5/2012 | Oh | H03M 13/1102 370/474 |
| 2012/0287850 A1* | 11/2012 | Wentink | H04W 52/0206 370/328 |
| 2013/0136016 A1* | 5/2013 | Lee | H04W 84/12 370/252 |
| 2013/0148625 A1* | 6/2013 | Kim | H04L 1/0025 370/329 |
| 2013/0279379 A1* | 10/2013 | Yang | H04L 27/2602 370/310 |
| 2013/0301551 A1* | 11/2013 | Ghosh | H04W 72/042 370/329 |
| 2014/0307650 A1* | 10/2014 | Vermani | H04L 5/0044 370/329 |
| 2015/0071221 A1* | 3/2015 | Tang | H04L 5/0044 370/329 |
| 2015/0131517 A1* | 5/2015 | Chu | H04W 72/005 370/312 |
| 2015/0139089 A1* | 5/2015 | Azizi | H04W 4/008 370/329 |
| 2015/0139205 A1* | 5/2015 | Kenney | H04W 52/241 370/338 |
| 2015/0171937 A1* | 6/2015 | Murakami | H04B 7/04 375/267 |
| 2015/0229505 A1* | 8/2015 | Porat | H04B 7/0452 370/329 |
| 2015/0365923 A1* | 12/2015 | Vermani | H04W 72/042 370/329 |
| 2016/0029377 A1* | 1/2016 | Masuda | H04L 27/2607 370/336 |
| 2016/0057657 A1* | 2/2016 | Seok | H04L 69/324 370/476 |
| 2016/0099796 A1* | 4/2016 | Yang | H03M 13/1177 714/776 |
| 2016/0142242 A1* | 5/2016 | Azizi | H04L 27/2649 370/235 |
| 2016/0212246 A1* | 7/2016 | Seok | H04L 69/323 |
| 2016/0249381 A1* | 8/2016 | Choi | H04W 74/06 |
| 2017/0149540 A1* | 5/2017 | Lee | H04L 5/005 |
| 2017/0195159 A1* | 7/2017 | Lee | H04L 27/2675 |
| 2017/0201357 A1* | 7/2017 | Choi | H04L 5/0007 |
| 2017/0223731 A1* | 8/2017 | Lee | H04W 74/006 370/329 |

* cited by examiner

FIG. 10

| L-STF | L-LTF | L-SIG | HE-SIG-A | HE-STF | HE-LTF | HE-LTF | HE-LTF | HE-LTF | HE-SIG-B | PSDU(AP to STA6) |
| | | | | HE-STF | HE-LTF | HE-LTF | HE-LTF | HE-LTF | HE-SIG-B | PSDU(AP to STA5) |
| | | | | HE-STF | HE-LTF | HE-LTF | HE-LTF | HE-LTF | HE-SIG-B | PSDU(AP to STA3,STA4) |
| | | | | HE-STF | HE-LTF | HE-LTF | HE-LTF | HE-LTF | HE-SIG-B | PSDU(AP to STA1,STA2) |

FIG. 11

| L-STF | L-LTF | L-SIG | HE-SIG-A | HE-STF | HE-LTF | HE-SIG-B | HE-LTF | HE-LTF | HE-LTF | HE-LTF | HE-SIG-C | PSDU(AP to STA6) |
|---|---|---|---|---|---|---|---|---|---|---|---|---|
| | | | | HE-STF | HE-LTF | HE-SIG-B | HE-LTF | HE-LTF | HE-LTF | HE-LTF | HE-SIG-C | PSDU(AP to STA5) |
| | | | | HE-STF | HE-LTF | HE-SIG-B | HE-LTF | HE-LTF | HE-LTF | HE-LTF | HE-SIG-C | PSDU(AP to STA3,STA4) |
| | | | | HE-STF | HE-LTF | HE-SIG-B | HE-LTF | HE-LTF | HE-LTF | HE-LTF | HE-SIG-C | PSDU(AP to STA1,STA2) |

FIG. 12

| L-STF | L-LTF | L-SIG | HE-SIG-A | HE-STF | HE-LTF | HE-SIG-B | HE-LTF | HE-LTF | HE-LTF | HE-LTF | HE-SIG-C | PSDU(STA4 to AP) |
| | | | | HE-STF | HE-LTF | HE-SIG-B | HE-LTF | HE-LTF | HE-LTF | HE-LTF | HE-SIG-C | PSDU(STA3 to AP) |
| | | | | HE-STF | HE-LTF | HE-SIG-B | HE-LTF | HE-LTF | HE-LTF | HE-LTF | HE-SIG-C | PSDU(STA2 to AP) |
| | | | | HE-STF | HE-LTF | HE-SIG-B | HE-LTF | HE-LTF | HE-LTF | HE-LTF | HE-SIG-C | PSDU(STA1 to AP) |

| Common Info | | | | Per-User Info | | | | | |
|---|---|---|---|---|---|---|---|---|---|
| UL MU Duration | Total LTFs | LTF Duration | Guard Interval | AID | RU Sub-Channel | RU MCS | RU STS | RU Beam-formed | RU Coding | RU STBC |

FIG. 20

| Order | Information |
|:-:|:-:|
| 1 | Category |
| 2 | HE Action |
| 3 | Operating Mode fields for DL or UL |

FIG. 21

| Channel Width | Reserved | Operating Mode Type (=0) | RX NSS | RX NSS Type |
|---|---|---|---|---|
| 2 | 1 | 1 | 3 | 1 |

Bits:

FIG. 22

| Channel Width | Reserved | Operating Mode Type (=1) | TX NSS | TX NSS Type |
|---|---|---|---|---|
| 2 | 1 | 1 | 3 | 1 |

Bits:

PHYSICAL LAYER PROTOCOL DATA UNIT FORMAT APPLIED WITH SPACE TIME BLOCK CODING IN A HIGH EFFICIENCY WIRELESS LAN

This application claims the benefit of Korean Patent Application No. 10-2014-0108177, filed on Aug. 20, 2014, which is hereby incorporated by reference as if fully set forth herein.

BACKGROUND OF THE INVENTION

Field of the Invention

The present invention relates to a Wireless Local Area Network (WLAN), and more particularly, to a Physical layer Protocol Data Unit (PPDU) format to which Space-Time Block Coding (STBC) is applied in a High Efficiency WLAN (HEW), a transmitting method, receiving method, transmitting apparatus, receiving apparatus, and software using the PPDU format, and a recording medium that stores the software.

Discussion of the Related Art

Along with the recent development of information and telecommunication technology, various wireless communication techniques have been developed. Among them, the WLAN enables a user to wirelessly access the Internet based on radio frequency technology in a home, an office, or a specific service area using a portable terminal such as a Personal Digital Assistant (PDA), a laptop computer, a Portable Multimedia Player (PMP), a smartphone, etc.

To overcome limitations in communication speed that the WLAN faces, the recent technical standards have introduced a system that increases the speed, reliability, and coverage of a wireless network. For example, the Institute of Electrical and Electronics Engineers (IEEE) 802.11n standard has introduced Multiple Input Multiple Output (MIMO) that is implemented using multiple antennas at both a transmitter and a receiver in order to support High Throughput (HT) at a data processing rate of up to 540 Mbps, minimize transmission errors, and optimize data rates.

As more and more devices such as smartphones have recently supported WLAN, more Access Points (APs) have been deployed to support this trend. Although WLAN devices with high performance conforming to the Institute of Electrical and Electronics Engineers (IEEE) 802.11ac standard are used more than legacy WLAN devices conforming to the IEEE 802.11g/n standard, a WLAN system having higher performance is required due to WLAN device users' increased use of large-capacity content such as an Ultra High Definition (UHD) video. A legacy WLAN system seeks to increase a bandwidth and a peak transmission rate, only to fail to increase performance that users actually feel.

HEW standardization is under discussion in a so-called IEEE 80.111x task group. The HEW aims to increase performance felt by users demanding large-capacity, high-rate services, while supporting simultaneous access of many Stations (STAs) in an environment in which a plurality of APs are densely deployed and the coverage of APs is overlapped.

However, there is no specified method for configuring a PPDU format to STBC is applied in a HEW.

SUMMARY OF THE INVENTION

Objects of the present invention is to provide a Physical layer Protocol Data Unit (PPDU) format to which Space-Time Block Coding (STBC) is applied in a High Efficiency WLAN (HEW), and a method and apparatus for transmitting and receiving signals using the PPDU format.

The objects of the present invention are not limited to the foregoing descriptions, and additional objects will become apparent to those having ordinary skill in the pertinent art to the present invention based upon the following descriptions.

In an aspect of the present invention, a method for transmitting data to a plurality of Stations (STAs) on a transmission channel by an Access Point (AP) in a WLAN may be provided. The transmission channel may be divided into a plurality of subchannels allocated to the plurality of STAs. The method may include generating a High Efficiency-Long Training Field (HE-LTF) field having a length determined based on whether Space-Time Block Coding (STBC) is applied to the plurality of subchannels, and transmitting a Physical layer Protocol Data Unit (PPDU) frame including the HE-LTF field and a plurality of data units for the plurality of STAs to the plurality of STAs.

In another aspect of the present invention, a method for transmitting data to an AP by an STA in a WLAN may be provided. The method may include receiving a trigger frame from the AP, the trigger frame allocating a plurality of subchannels to the STA and one or more other STAs and including information about a length of a HE-LTF field, the length of the HE-LTF field being a length determined based on whether STBC is applied to the plurality of subchannels, and transmitting, to the AP on a subchannel allocated to the STA, a Physical layer Protocol Data Unit (PPDU) frame including one or more HE-LTF elements corresponding to a number determined based on the information about the length of the HE-LTF field, and a data unit.

In another aspect of the present invention, an AP apparatus for transmitting data to a plurality of STAs on a transmission channel in a WLAN may be provided. The transmission channel may be divided into a plurality of subchannels allocated to the plurality of STAs. The AP apparatus may include a baseband processor, an RF transceiver, a memory, etc. The baseband processor may be configured to generate a HE-LTF field having a length determined based on whether STBC is applied to the plurality of subchannels, and to transmit a PPDU frame including the HE-LTF field and a plurality of data units for the plurality of STAs to the plurality of STAs using the RF transceiver.

In another aspect of the present invention, an STA apparatus for transmitting data to an AP in a WLAN may be provided. The STA apparatus may include a baseband processor, an RF transceiver, a memory, etc. The baseband processor may be configured to receive a trigger frame from the AP using the RF transceiver, the trigger frame allocating a plurality of subchannels to the STA and one or more other STAs and including information about a length of a HE-LTF field, the length of the HE-LTF field being determined based on whether STBC is applied to the plurality of subchannels, and to transmit, to the AP on a subchannel allocated to the STA, a Physical layer Protocol Data Unit (PPDU) frame including one or more HE-LTF elements corresponding to a number determined based on the information about the length of the HE-LTF field, and a data unit using the RF transceiver.

In another aspect of the present invention, a software or computer-readable medium having instructions executable for an AP apparatus to transmit data to a plurality of STAs on a transmission channel in a WLAN may be provided. The transmission channel may be divided into a plurality of subchannels allocated to the plurality of STAs. The executable instructions may cause the AP apparatus to generate a HE-LTF field having a length determined based on whether STBC is applied to the plurality of subchannels, and to transmit a PPDU frame including the HE-LTF field and a plurality of data units for the plurality of STAs to the plurality of STAs.

In another aspect of the present invention, a software or computer-readable medium having instructions executable for an STA apparatus to transmit data to an AP in a WLAN may be provided. The executable instructions may cause the STA apparatus to receive a trigger frame from the AP, the trigger frame allocating a plurality of subchannels to the STA and one or more other STAs and including information about a length of a HE-LTF field, the length of the HE-LTF field being determined based on whether STBC is applied to the plurality of subchannels, and to transmit to the AP on a subchannel allocated to the STA, a Physical layer Protocol Data Unit (PPDU) frame including one or more HE-LTF elements corresponding to a number determined based on the information about the length of the HE-LTF field, and a data unit.

It is to be understood that both the foregoing summarized features are exemplary aspects of the following detailed description of the present invention without limiting the scope of the present invention.

According to the present invention, a PPDU format to which STBC is applied, and a method and apparatus for transmitting and receiving signals using the PPDU format can be provided.

The advantages of the present invention are not limited to the foregoing descriptions, and additional advantages will become apparent to those having ordinary skill in the pertinent art to the present invention based upon the following descriptions.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 10 depicts the starting and ending points of an High Efficiency Long Training Field (HE-LTF) field in a HE PPDU frame format according to the present invention;

FIG. 11 depicts a High Efficiency SIGnal B (HE-SIG-B) field and a High Efficiency SIGnal C (HE-SIG-C) field in the HE PPDU frame format according to the present invention;

FIG. 12 depicts another exemplary HE PPDU frame format according to the present invention;

FIGS. 13 and 14 depict exemplary configurations of High Efficiency-Long Training Fields (HE-LTFs) and data units for a HE PPDU according to the present invention;

FIG. 15 depicts an exemplary HE PPDU padding according to the present invention;

FIG. 17 depicts an exemplary format of a trigger frame;

FIGS. 20, 21, and 22 depict an exemplary format of an Operating Mode Notification frame.

DETAILED DESCRIPTION OF THE INVENTION

Figure 1:
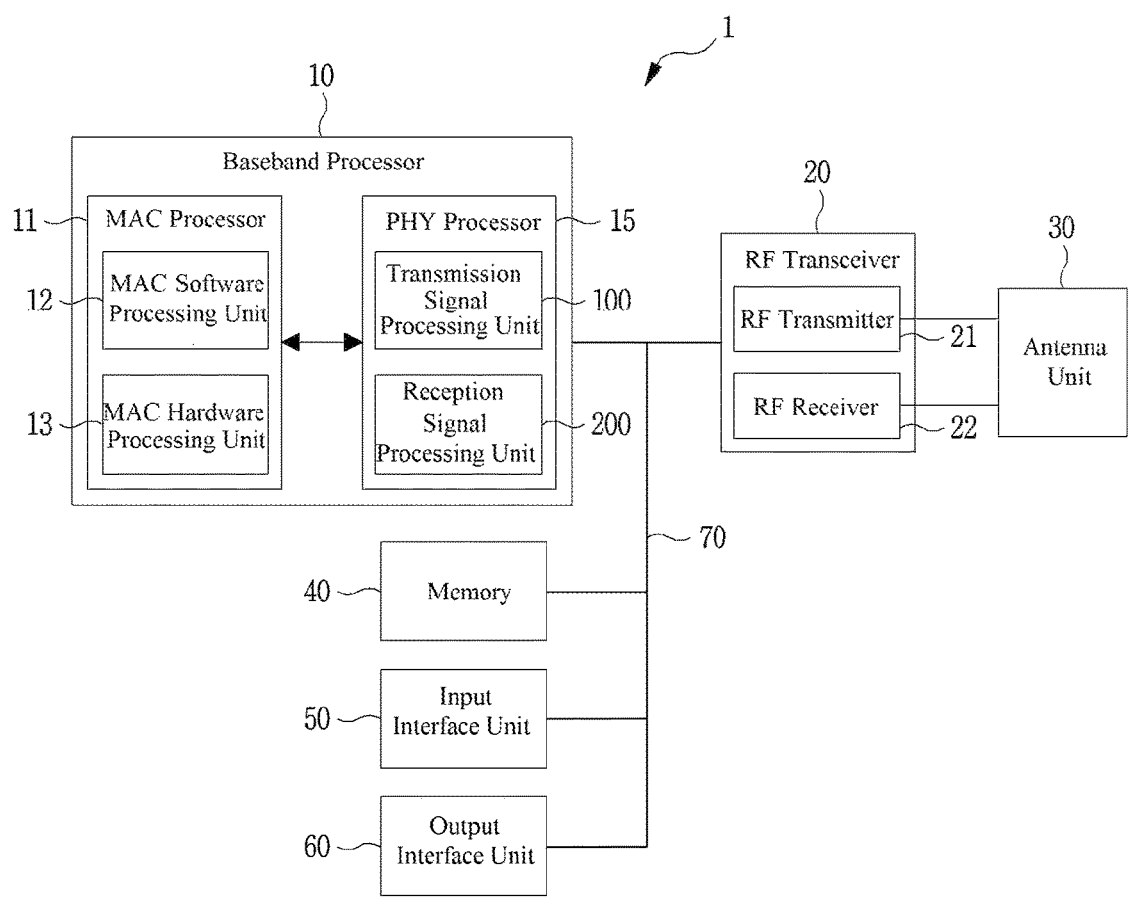
FIG. 1 is a block diagram of a Wireless Local Area Network (WLAN) device.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In a Wireless Local Area network (WLAN), a Basic Service Set (BSS) includes a plurality of WLAN devices. A WLAN device may include a Medium Access Control (MAC) layer and a PHYsical (PHY) layer according to Institute of Electrical and Electronics Engineers (IEEE) 802.11 series standards. In the plurality of WLAN devices, at least one the WLAN device may be an Access Point (AP) and the other WLAN devices may be non-AP Stations (non-AP STAs). Alternatively, all of the plurality of WLAN devices may be non-AP STAs in an ad-hoc networking environment. In general, AP STA and non-AP STA may be each referred to as a STA or may be collectively referred to as STAs. However, for ease of description herein, only the non-AP STAs may be referred to herein as the STAs.

FIG. 1 is a block diagram of a WLAN device.

Referring to FIG. 1, a WLAN device 1 includes a baseband processor 10, a Radio Frequency (RF) transceiver 20, an antenna unit 30, a memory 40, an input interface unit 50, an output interface unit 60, and a bus 70.

The baseband processor 10 may be simply referred to as a processor, performs baseband signal processing described in the present specification, and includes a MAC processor (or MAC entity) 11 and a PHY processor (or PHY entity) 15.

In an embodiment of the present invention, the MAC processor 11 may include a MAC software processing unit 12 and a MAC hardware processing unit 13. The memory 40 may store software (hereinafter referred to as 'MAC software') including at least some functions of the MAC layer. The MAC software processing unit 12 may execute the MAC software to implement some functions of the MAC layer, and the MAC hardware processing unit 13 may implement the remaining functions of the MAC layer in hardware (hereinafter referred to as 'MAC hardware').

However, the MAC processor 11 is not limited to the foregoing implementation examples.

The PHY processor 15 includes a transmitting (TX) signal processing unit 100 and a receiving (RX) signal processing unit 200.

The baseband processor 10, the memory 40, the input interface unit 50, and the output interface unit 60 may communicate with one another via the bus 70.

The RF transceiver 20 includes an RF transmitter 21 and an RF receiver 22.

The memory 40 may further store an Operating System (OS) and applications. The input interface unit 50 receives information from a user, and the output interface unit 60 outputs information to the user.

The antenna unit 30 includes one or more antennas. When Multiple input Multiple Output (MIMO) or Multi-User MIMO (MU-MIMO) is used, the antenna unit 30 may include a plurality of antennas.

Figure 2:
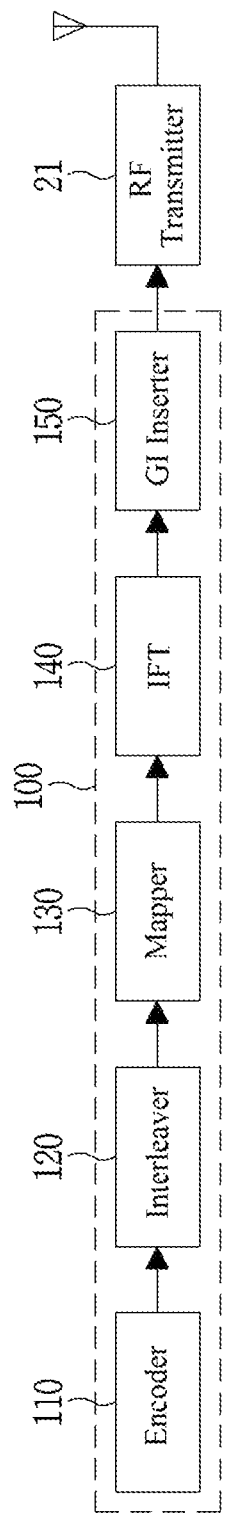
FIG. 2 is a schematic block diagram of an exemplary transmitting signal processing unit in a WLAN.

FIG. 2 is a schematic block diagram of an exemplary transmission signal processor in a WLAN.

Referring to FIG. 2, the transmitting signal processing unit 100 may include an encoder 110, an interleaver 120, a mapper 130, an Inverse Fourier Transformer (IFT) 140, and a Guard Interval (GI) inserter 150.

The encoder 110 encodes input data. For example, the encoder 110 may be a Forward Error Correction (FEC) encoder. The FEC encoder may include a Binary Convolutional Code (BCC) encoder followed by a puncturing device, or the FEC encoder may include a Low-Density Parity-Check (LDPC) encoder.

The transmitting signal processing unit 100 may further include a scrambler for scrambling the input data before encoding to reduce the probability of long sequences of 0s or 1s. If BCC encoding is used in the encoder 110, the transmitting signal processing unit 100 may further include an encoder parser for demultiplexing the scrambled bits among a plurality of BCC encoders. If LDPC encoding is used in the encoder 110, the transmitting signal processing unit 100 may not use the encoder parser.

The interleaver 120 interleaves the bits of each stream output from the encoder 110 to change the order of bits. Interleaving may be applied only when BCC encoding is used in the encoder 110. The mapper 130 maps the sequence of bits output from the interleaver 120 to constellation points. If LDPC encoding is used in the encoder 110, the mapper 130 may further perform LDPC tone mapping in addition to constellation mapping.

When MIMO or MU-MIMO is used, the transmitting signal processing unit 100 may use a plurality of interleavers 120 and a plurality of mappers 130 corresponding to the number of spatial streams, $N_{SS}$. In this case, the transmitting signal processing unit 100 may further include a stream parser for dividing outputs of the BCC encoders or output of the LDPC encoder into blocks that are sent to different interleavers 120 or mappers 130. The transmitting signal processing unit 100 may further include a Space-Time Block Code (STBC) encoder for spreading the constellation points from the $N_{SS}$ spatial streams into $N_{STS}$ space-time streams and a spatial mapper for mapping the space-time streams to transmit chains. The spatial mapper may use direct mapping, spatial expansion, or beamforming.

The IFT 140 converts a block of constellation points output from the mapper 130 or the spatial mapper to a time-domain block (i.e., a symbol) by using Inverse Discrete Fourier Transform (IDFT) or Inverse Fast Fourier Transform (IFFT). If the STBC encoder and the spatial mapper are used, the IFT 140 may be provided for each transmit chain.

When MIMO or MU-MIMO is used, the transmitting signal processing unit 100 may insert Cyclic Shift Diversities (CSDs) to prevent unintentional beamforming. The CSD insertion may occur before or after IFT. The CSD may be specified per transmit chain or may be specified per space-time stream. Alternatively, the CSD may be applied as a part of the spatial mapper.

When MU-MIMO is used, some blocks before the spatial mapper may be provided for each user.

The GI inserter 150 prepends a GI to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When MIMO or MU-MIMO is used, the GI inserter 150 and the RF transmitter 21 may be provided for each transmit chain.

Figure 3:
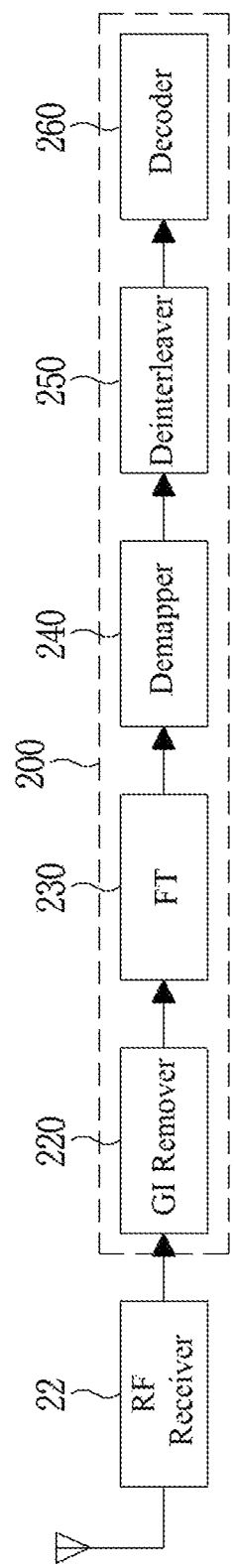
FIG. 3 is a schematic block diagram of an exemplary receiving signal processing unit in a WLAN.

FIG. 3 is a schematic block diagram of an exemplary a receiving signal processor in a WLAN.

Referring to FIG. 3, the receiving signal processing unit 200 includes a GI remover 220, a Fourier Transformer (FT) 230, a demapper 240, a deinterleaver 250, and a decoder 260.

An RF receiver 22 receives an RF signal via the antenna unit 30 and converts the RF signal into symbols. The GI remover 220 removes the GI from the symbol. When MIMO or MU-MIMO is used, the RF receiver 22 and the GI remover 220 may be provided for each receive chain.

The FT 230 converts the symbol (i.e., the time-domain block) into a block of constellation points by using a Discrete Fourier Transform (DFT) or a Fast Fourier Transform (FFT). The FT 230 may be provided for each receive chain.

When MIMO or MU-MIMO is used, the receiving signal processing unit 200 may include a spatial demapper for converting Fourier Transformed receiver chains to constellation points of the space-time streams, and an STBC decoder for despreading the constellation points from the space-time streams into the spatial streams.

The demapper 240 demaps the constellation points output from the FT 230 or the STBC decoder to bit streams. If LDPC encoding is applied to the received signal, the demapper 240 may further perform LDPC tone demapping before constellation demapping. The deinterleaver 250 deinterleaves the bits of each stream output from the demapper 240. Deinterleaving may be applied only when a BCC encoding scheme is applied to the received signal.

When MIMO or MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining streams output from the deinterleavers 250.

The decoder 260 decodes the streams output from the deinterleaver 250 or the stream deparser. For example, the decoder 100 may be an FEC decoder. The FEC decoder may include a BCC decoder or an LDPC decoder. The receiving signal processing unit 200 may further include a descrambler for descrambling the decoded data. If BCC decoding is used in the decoder 260, the receiving signal processing unit 200 may further include an encoder deparser for multiplexing the data decoded by a plurality of BCC decoders. If LDPC decoding is used in the decoder 260, the receiving signal processing unit 200 may not use the encoder deparser.

In a WLAN system, Carrier Sense Multiple Access with Collision Avoidance (CSMA/CA) is a basic MAC access mechanism. The CSMA/CA mechanism is referred to as Distributed Coordination Function (DCF) of IEEE 802.11 MAC, shortly as a 'listen before talk' access mechanism. According to the CSMA/CA mechanism, an AP and/or a STA may sense a medium or a channel for a predetermined time before starting transmission, that is, may perform Clear Channel Assessment (CCA). If the AP or the STA determines that the medium or channel is idle, it may start to transmit a frame on the medium or channel. On the other hand, if the AP and/or the STA determines that the medium or channel is occupied or busy, it may set a delay period (e.g., a random backoff period), wait for the delay period without starting transmission, and then attempt to transmit a frame. By applying a random backoff period, a plurality of STAs are expected to attempt frame transmission after waiting for different time periods, resulting in minimizing collisions.

Figure 4:
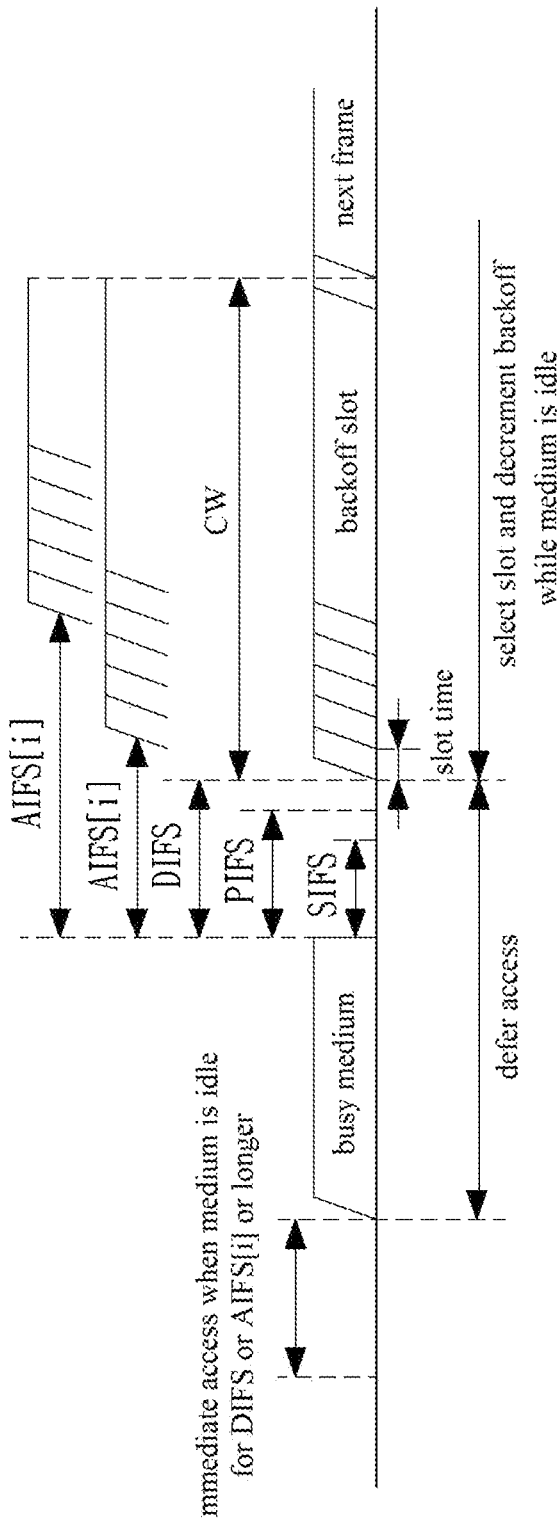
FIG. 4 depicts a relationship between InterFrame Spaces (IFSs)

FIG. 4 depicts a relationship between InterFrame Spaces (IFSs).

WLAN devices may exchange data frames, control frames, and management frames with each other.

A data frame is used for transmission of data forwarded to a higher layer. The WLAN device transmits the data frame after performing backoff if a Distributed Coordination Function IFS (DIFS) has elapsed from a time when the medium has been idle. A management frame is used for exchanging management information which is not forwarded to the higher layer. The WLAN device transmits the management frame after performing backoff if an IFS such as the DIFS or a Point Coordination Function IFS (PIFS) has elapsed. Subtype frames of the management frame include a beacon frame, an association request/response frame, a probe request/response frame, and an authentication request/response frame. A control frame is used for controlling access to the medium. Subtype frames of the control frame include a Request-To-Send (RTS) frame, a Clear-To-Send (CTS) frame, and an ACKnowledgement (ACK) frame. In the case that the control frame is not a response frame to another frame, the WLAN device transmits the control frame after performing backoff if the DIFS has elapsed. In case that the control frame is a response frame to another frame, the WLAN device transmits the control frame without performing backoff if a Short IFS (SIFS) has elapsed. The type and subtype of a frame may be identified by a type field and a subtype field in a Frame Control (FC) field.

On the other hand, a Quality of Service (QoS) STA transmits a frame after performing backoff if an Arbitration IFS (AIFS) for an associated Access Category (AC), i.e., AIFS[i] (i is determined based on AC) has elapsed. In this case, the AIFC[i] may be used for a data frame, a management frame, or a control frame that is not a response frame.

In the example illustrated in FIG. 4, upon generation of a frame to be transmitted, a STA may transmit the frame immediately, if it determines that the medium is idle for the DIFS or AIFS[i] or longer. The medium is busy for a time period during which the STA transmits the frame. During the time period, upon generation of a frame to be transmitted, another STA may defer access by confirming that the medium is busy. If the medium gets idle, the STA that intends to transmit the frame may perform a backoff operation after a predetermined IFS in order to minimize collision with any other STA. Specifically, the STA that intends to transmit the frame selects a random backoff count, waits for a slot time corresponding to the selected random backoff count, and then attempt transmission. The random backoff count is determined based on a Contention Window (CW) parameter and the medium is monitored continuously during count-down of backoff slots (i.e. decrement a backoff countdown) according to the determined backoff count. If the STA monitors the medium as busy, the STA discontinues the count-down and waits, and then, if the medium gets idle, the STA resumes the count-down. If the backoff slot count reaches 0, the STA may transmit the next frame.

Figure 5:
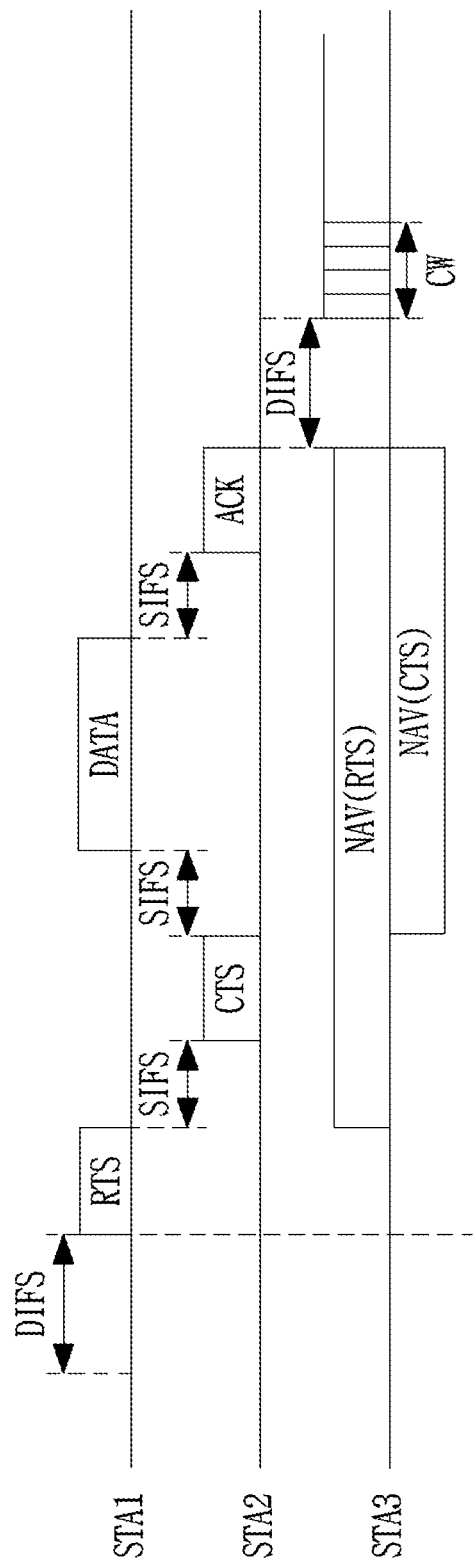
FIG. 5 is a conceptual diagram illustrating a procedure for transmitting a frame in Carrier Sense Multiple Access with Collision Avoidance (CSMA/CA) for avoiding collisions between frames in a channel.

FIG. 5 is a conceptual diagram illustrating a CSMA/CA-based frame transmission procedure for avoiding collisions between frames in a channel.

Referring FIG. 5, a first STA (STA1) is a transmit WLAN device for transmitting data, a second STA (STA2) is a receive WLAN device for receiving the data from STA1, and a third STA (STA3) is a WLAN device which may be located in an area where a frame transmitted from STA1 and/or a frame transmitted from STA2 can be received by STA3.

STA1 may determine whether the channel is busy by carrier sensing. The STA1 may determine the channel occupation based on an energy level on the channel or correlation of signals in the channel, or may determine the channel occupation by using a Network Allocation Vector (NAV) timer.

After determining that the channel is not being used by other devices during DIFS (that is, the channel is idle), STA1 may transmit an RTS frame to STA2 after performing backoff. Upon receiving the RTS frame, STA2 may transmit a CTS frame as a response to the CTS frame after SIFS.

When STA3 receives the RTS frame, STA3 may set the NAV timer for a transmission duration of subsequently transmitted frame by using duration information included in the RTS frame. For example, the NAV timer may be set for a duration of SIFS+CTS frame duration+SIFS+data frame duration+SIFS+ACK frame duration. When STA3 receives the CTS frame, it may set the NAV timer for a transmission duration of subsequently transmitted frames by using duration information included in the CTS frame. For example, the NAV timer may be set for a duration of SIFS+a data frame duration+SIFS+an ACK frame duration. Upon receiving a new frame before the NAV timer expires, STA3 may update the NAV timer by using duration information included in the new frame. STA3 does not attempt to access the channel until the NAV timer expires.

When STA1 receives the CTS frame from STA2, it may transmit a data frame to STA2 after SIFS elapsed from the CTS frame has been completely received. Upon successfully receiving the data frame, STA2 may transmit an ACK frame as a response to the data frame after SIFS elapsed.

When the NAV timer expires, STA3 may determine whether the channel is busy through the use of carrier sensing. Upon determining that the channel is not in use by other devices during DIFS and after the NAV timer has expired, STA3 may attempt channel access after a contention window after a random backoff has elapsed.

Figure 6:
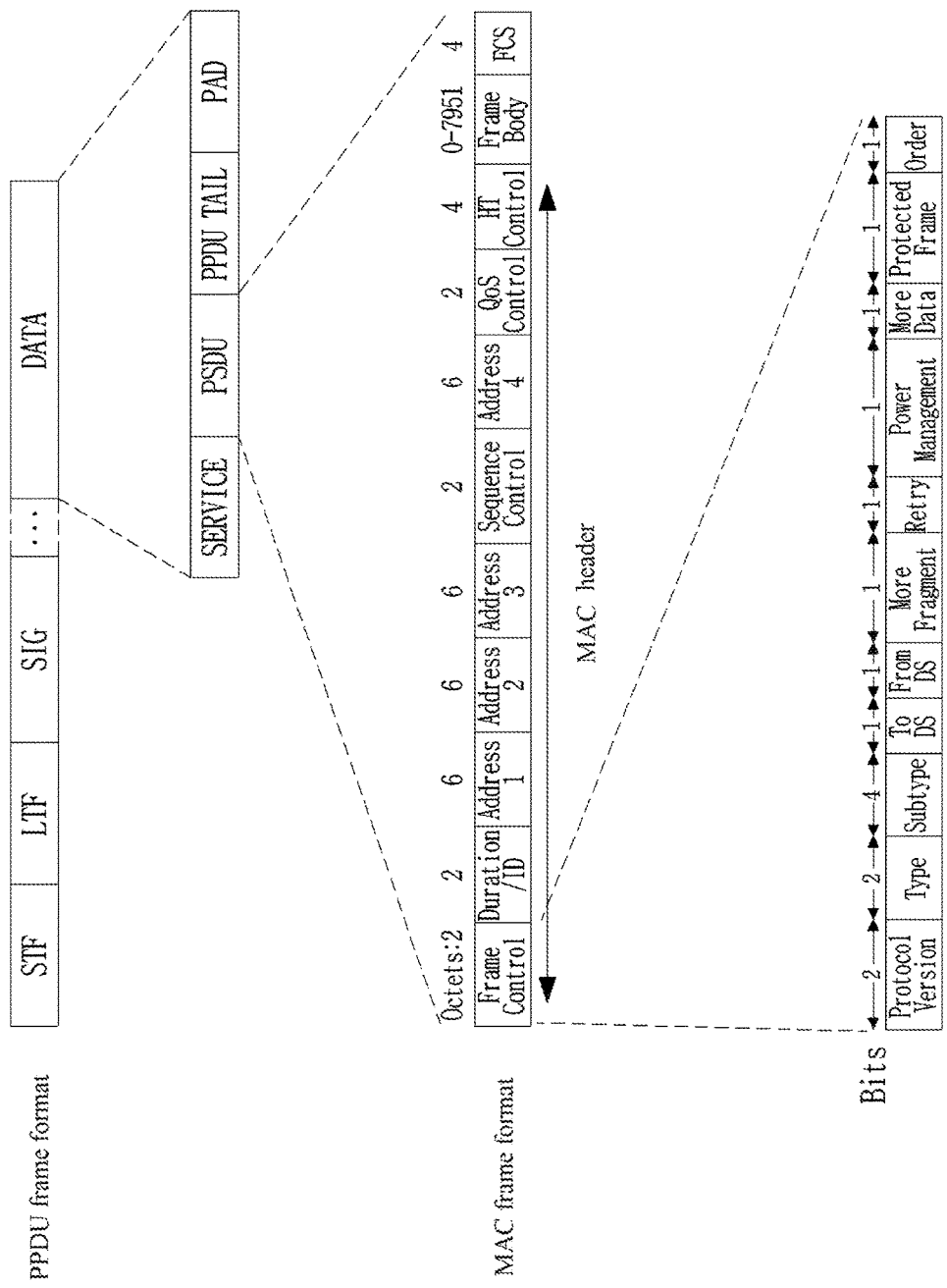
FIG. 6 depicts an exemplary frame structure in a WLAN system.

FIG. 6 depicts an exemplary frame structure in a WLAN system.

PHY layer may prepare a transmission MAC PDU (MPDU) in response to an instruction (or a primitive, which is a set of instructions or a set of parameters) by the MAC layer. For example, upon receipt of an instruction requesting transmission start from the MAC layer, the PHY layer may switch to a transmission mode, construct a frame with information (e.g., data) received from the MAC layer, and transmit the frame.

Upon detection of a valid preamble in a received frame, the PHY layer monitors a header of the preamble and transmits an instruction indicating reception start of the PHY layer to the MAC layer.

Information is transmitted and received in frames in the WLAN system. For this purpose, a Physical layer Protocol Data Unit (PPDU) frame format is defined.

A PPDU frame may include a Short Training Field (STF) field, a Long Training Field (LTF) field, a SIGNAL (SIG) field, and a Data field. The most basic (e.g., a non-High Throughput (non-HT)) PPDU frame may include only a Legacy-STF (L-STF) field, a Legacy-LTF (L-LTF) field, a SIG field, and a Data field. Additional (or other types of) STF, LTF, and SIG fields may be included between the SIG field and the Data field according to the type of a PPDU frame format (e.g., an HT-mixed format PPDU, an HT-greenfield format PPDU, a Very High Throughput (VHT) PPDU, etc.).

The STF is used for signal detection, Automatic Gain Control (AGC), diversity selection, fine time synchronization, etc. The LTF field is used for channel estimation, frequency error estimation, etc. The STF and the LTF fields may be referred to as signals for OFDM PHY layer synchronization and channel estimation.

The SIG field may include a RATE field and a LENGTH field. The RATE field may include information about a modulation scheme and coding rate of data. The LENGTH field may include information about the length of the data. The SIG field may further include parity bits, SIG TAIL bits, etc.

The Data field may include a SERVICE field, a Physical layer Service Data Unit (PSDU), and PPDU TAIL bits. When needed, the Data field may further include padding bits. A part of the bits of the SERVICE field may be used for synchronization at a descrambler of a receiver. The PSDU corresponds to a MAC PDU defined at the MAC layer and may include data generated/used in a higher layer. The PPDU TAIL bits may be used to return an encoder to a zero state. The padding bits may be used to match the length of the Data filed in predetermined units.

A MAC PDU is defined according to various MAC frame formats. A basic MAC frame includes a MAC header, a frame body, and a Frame Check Sequence (FCS). The MAC frame includes a MAC PDU and may be transmitted and received in the PSDU of the data part in the PPDU frame format.

The MAC header includes a Frame Control field, a Duration/Identifier (ID) field, an Address field, etc. The Frame Control field may include control information required for frame transmission/reception. The Duration/ID field may be set to a time for transmitting the frame. For details of Sequence Control, QoS Control, and HT Control subfields of the MAC header, refer to the IEEE 802.11-2012 technical specification.

The Frame Control field of the MAC header may include Protocol Version, Type, Subtype, To DS, From DS, More Fragment, Retry, Power Management, More Data, Protected Frame, and Order subfields. For the contents of each subfield in the Frame Control field, refer to the IEEE 802.11-2012 technical specification.

A Null-Data Packet (NDP) frame format is a frame format that does not include a data packet. In other words, the NDP frame format includes only a Physical Layer Convergence Protocol (PLCP) header part (i.e., the STF, LTF, and SIG fields) of the general PPDU frame format, without the remaining part (i.e., the Data field) of the general PPDU frame format. The NDP frame format may be referred to as a short frame format.

The IEEE 802.11 ax task group is discussing a WLAN system, called a High Efficiency WLAN (HEW) system, that operates in 2.4 GHz or 5 GHz and supports a channel bandwidth (or channel width) of 20 MHz, 40 MHz, 80 MHz, or 160 MHz. The present invention defines a new PPDU frame format for the IEEE 802.11ax HEW system. The new PPDU frame format may support MU-MIMO or OFDMA. A PPDU of the new format may be referred to as a 'HEW PPDU' or 'HE PPDU' (similarly, HEW xyz may be referred to as 'HE xyz' or 'HE-xyz' in the following descriptions).

In present specification, the term 'MU-MIMO or OFDMA mode' includes MU-MIMO without using OFDMA, or OFDMA mode without using MU-MIMO in an orthogonal frequency resource, or OFDMA mode using MU-MIMO in an orthogonal frequency resource.

Figure 7:
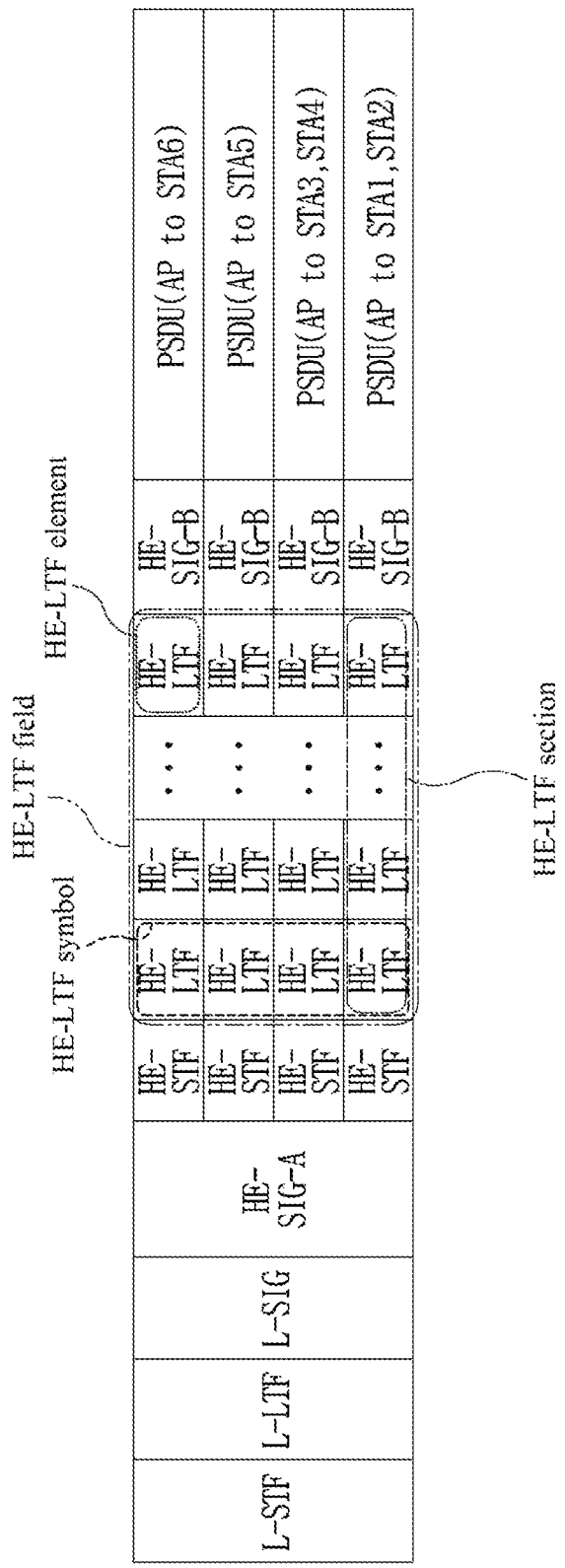
FIG. 7 depicts an exemplary High Efficiency (HE) Physical layer Protocol Data Unit (PPDU) frame format according to the present invention.

FIG. 7 depicts an exemplary HE PPDU frame format according to the present invention.

Referring to FIG. 7, the vertical axis represents frequency and the horizontal axis represents time. It is assumed that frequency and time increase in the upward direction and the right direction, respectively.

In the example of FIG. 7, one channel includes four subchannels. An L-STF, an L-LTF, an L-SIG, and an HE-SIG-A may be transmitted per channel (e.g., 20 MHz), a HE-STF and a HE-LTF may be transmitted on each subchannel being a basic subchannel unit (e.g., 5 MHz), and a HE-SIG-B and a PSDU may be transmitted on each of subchannels allocated to a STA. A subchannel allocated to a STA may have a size required for PSDU transmission to the STA. The size of the subchannel allocated to the STA may be N (N=1, 2, 3, . . . ) times as large as the size of basic subchannel unit (i.e., a subchannel having a minimum size). In the example of FIG. 7, the size of a subchannel allocated to each STA is equal to the size of the basic subchannel unit. For example, a first subchannel may be allocated for PSDU transmission from an AP to STA1 and STA2, a second subchannel may be allocated for PSDU transmission from the AP to STA3 and STA4, a third subchannel may be allocated for PSDU transmission from the AP to STA5, and a fourth subchannel may be allocated for PSDU transmission from the AP to STA6.

While the term subchannel is used in the present disclosure, the term subchannel may be referred to as Resource Unit (RU) or subband. In particular, the terms like OFDMA subchannel, OFDMA RU, OFDMA subband can be used in embodiments for OFDMA in the present disclosure. Terms like a bandwidth of a subchannel, a number of tones (or subcarriers) allocated to a subchannel, a number of data tones (or data subcarriers) allocated to a subchannel can be used to express a size of a subchannel. A subchannel refers to a frequency band allocated to a STA and a basic subchannel unit refers to a basic unit used to represent the size of a subchannel. While the size of the basic subchannel unit is 5 MHz in the above example, this is purely exemplary. Thus, the basic subchannel unit may have a size of 2.5 MHz.

In FIG. 7, a plurality of HE-LTF elements are distinguished in the time and frequency domains. One HE-LTF element may correspond to one OFDM symbol in time domain and one subchannel unit (i.e., a subchannel bandwidth allocated to a STA) in frequency domain. The HE-LTF elements are logical units and the PHY layer does not necessarily operate in units of an HE-LTF element. In the following description, a HE-LTF element may be referred to shortly as a HE-LTF.

A HE-LTF symbol may correspond to a set of HE-LTF elements in one OFDM symbol in time domain and in one channel unit (e.g., 20 MHz) in frequency domain.

A HE-LTF section may correspond to a set of HE-LTF elements in one or more OFDM symbols in time domain and in one subchannel unit (i.e., a subchannel bandwidth allocated to a STA) in frequency domain.

A HE-LTF field may be a set of HE-LTF elements, HE-LTF symbols, or HE-LTF sections for a plurality of stations.

The L-STF field is used for frequency offset estimation and phase offset estimation, for preamble decoding at a legacy STA (i.e., a STA operating in a system such as IEEE 802.11a/b/g/n/ac). The L-LTF field is used for channel estimation, for the preamble decoding at the legacy STA. The L-SIG field is used for the preamble decoding at the legacy STA and provides a protection function for PPDU transmission of a third-party STA (e.g., setting a NAV based on the value of a LENGTH field included in the L-SIG field).

HE-SIG-A (or HEW SIG-A) represents High Efficiency Signal A (or High Efficiency WLAN Signal A), and includes HE PPDU (or HEW PPDU) modulation parameters, etc. for HE preamble (or HEW preamble) decoding at a HE STA (or HEW STA). The parameters set included in the HEW SIG-A field may include one or more of Very High Throughput (VHT) PPDU modulation parameters transmitted by IEEE 802.11ac stations, as listed in [Table 1] below, to ensure backward compatibility with legacy STAs (e.g., IEEE 802.11ac stations).

TABLE 1

| Two parts of VHT-SIG-A | Bit | Field | Number of bits | Description |
|---|---|---|---|---|
| VHT-SIG-A1 | B0-B1 | BW | 2 | Set to 0 for 20 MHz, 1 for 40 MHz, 2 for 80 MHz, and 3 for 160 MHz and 80 + 80 MHz. |
| | B2 | Reserved | 1 | Reserved, Set to 1. |
| | B3 | STBC | 1 | For a VHT SU PPDU: Set to 1 if space time block coding is used and set to 0 otherwise. For a VHT MU PPDU: Set to 0. |
| | B4-B9 | Group ID | 6 | Set to the value of the TXVECTOR parameter GROUP_ID. A value of 0 or 63 indicates a VHT SU PPDU; otherwise, indicates a VHT MU PPDU. |
| | B10-B21 | NSTS/Partial AID | 12 | For a VHT MU PPDU: NSTS is divided into 4 user positions of 3 bits each. User position p, where $0 \leq p \leq 3$, uses bits B(10 + 3p) to B(12 + 3p). The number of space-time streams for user u are indicated at user position p = USER_POSITION[u] where u = 0, 1, . . . , NUM_USERS − 1 and the notation A[b] denotes the value of array A at index b. Zero space-time streams are indicated at positions not listed in the USER_POSITION array. Each user position is set as follows: Set to 0 for 0 space-time streams Set to 1 for 1 space-time stream Set to 2 for 2 space-time streams Set to 3 for 3 space-time streams Set to 4 for 4 space-time streams Values 5-7 are reserved For a VHT SU PPDU: B10-B12 Set to 0 for 1 space-time stream Set to 1 for 2 space-time streams Set to 2 for 3 space-time streams Set to 3 for 4 space-time streams Set to 4 for 5 space-time streams Set to 5 for 6 space-time streams Set to 6 for 7 space-time streams Set to 7 for 8 space-time streams B13-B21 Partial AID: Set to the value of the TXVECTOR parameter PARTIAL_AID. Partial AID provides an abbreviated indication of the intended recipient(s) of the PSDU (see 9.17a). |
| | B22 | TXOP_PS_NOT_ALLOWED | 1 | Set to 0 by VHT AP if it allows non-AP VHT STAs in TXOP power save mode to enter Doze state during a TXOP. Set to 1 otherwise. The bit is reserved and set to 1 in VHT PPDUs transmitted by a non-AP VHT STA. |
| | B23 | Reserved | 1 | Set to 1 |
| VHT-SIG-A2 | B0 | Short GI | 1 | Set to 0 if short guard interval is not used in the Data field. Set to 1 if short guard interval is used in the Data field. |
| | B1 | Short GI $N_{SYM}$ Disambiguation | 1 | Set to 1 if short guard interval is used and $N_{SYM}$ mod 10 = 9; otherwise, set to 0. $N_{SYM}$ is defined in 22.4.3. |
| | B2 | SU/MU[0] Coding | 1 | For a VHT SU PPDU, B2 is set to 0 for BCC, 1 for LDPC For a VHT MU PPDU, if the MU[0] NSTS field is nonzero, then B2 indicates the coding used for user u with USER_POSITION[u] = 0; set to 0 for BCC and 1 for LDPC. If the MU[0] NSTS field is 0, then this field is reserved and set to 1. |

TABLE 1-continued

| Two parts of VHT-SIG-A | Bit | Field | Number of bits | Description |
|---|---|---|---|---|
| | B3 | LDPC Extra OFDM Symbol | 1 | Ser to 1 if the LDPC PPDU encoding process (if an SU PPDU), or at least one LDPC user's PPDU encoding process (if a VHT MU PPDU), results in an extra OFDM symbol (or symbols) as described in 22.3.10.5.4 and 22.3.10.5.5. Set to 0 otherwise. |
| | B4-B7 | SU VHT-MCS/MU[1-3] Coding | 4 | For a VHT SU PPDU: VHT-MCS index For a VHT MU PPDU: If the MU[1] NSTS field is nonzero, then B4 indicates coding for user u with USER_POSITION[u] = 1: set to 0 for BCC, 1 for LDPC. If the MU[1] NSTS field is 0, then B4 is reserved and set to 1. If the MU[2] NSTS field is nonzero, then B5 indicates coding for user u with USER_POSITION[u] = 2: set to 0 for BCC, 1 for LDPC. If the MU[2] NSTS field is 0, then B5 is reserved and set to 1. If the MU[3] NSTS field is nonzero, then B6 indicates coding for user u with USER_POSITION[u] = 3: set to 0 for BCC, 1 for LDPC. If the MU[3] NSTS field is 0, then B6 is reserved and set to 1. B7 is reserved and set to 1 |
| | B8 | Beamformed | 1 | For a VHT SU PPDU: Set to 1 if a Beamforming steering matrix is applied to the waveform in an SU transmission as described in 20.3.11.11.2. set to 0 otherwise. For a VHT MU PPDU: Reserved and set to 1 NOTE-If equal to 1 smoothing is not recommended. |
| | B9 | Reserved | 1 | Reserved and set to 1 |
| | B10-B17 | CRC | 8 | CRC calculated as in 20.3.9.4.4 with c7 in B10. Bits 0-23 of HT-SIG1 and bits 0-9 of HT-SIG2 are replaced by bits 0.23 of VHT-SIG-A1 and bits 0-9 of VHT-SIG-A2, respectively. |
| | B18-B23 | Tail | 6 | Used to terminate the trellis of the convolutional decoder. Set to 0. |

[Table 1] illustrates fields, bit positions, numbers of bits, and descriptions included in each of two parts, VHT-SIG-A1 and VHT-SIG-A2, of the VHT-SIG-A field defined by the IEEE 802.11ac standard. For example, a BW (BandWidth) field occupies two Least Significant Bits (LSBs), B0 and B1 of the VHT-SIG-A1 field and has a size of 2 bits. If the 2 bits are set to 0, 1, 2, or 3, the BW field indicates 20 MHz, 40 MHz, 80 MHz, or 160 and 80+80 MHz. For details of the fields included in the VHT-SIG-A field, refer to the IEEE 802.11ac-2013 technical specification. In the HE PPDU frame format of the present invention, the HE-SIG-A field may include one or more of the fields included in the VHT-SIG-A field, and it may provide backward compatibility with IEEE 802.11ac stations.

Figure 8:
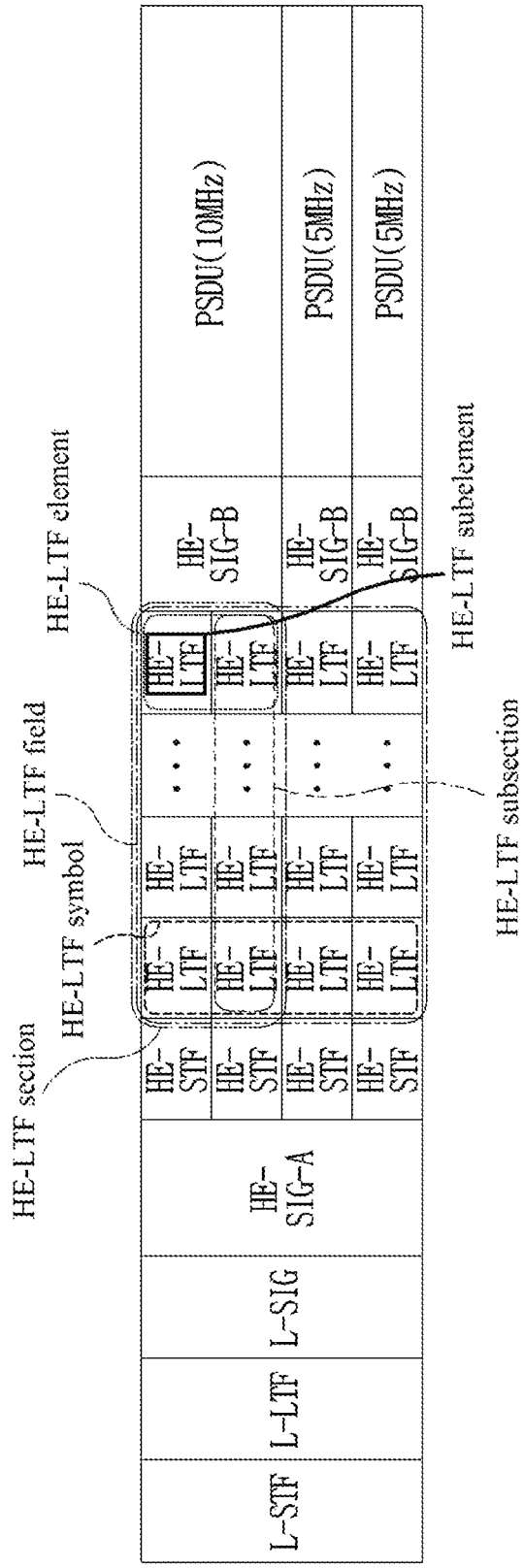
FIG. 8 depicts subchannel allocation in a HE PPDU frame format according to the present invention.

FIG. 8 depicts subchannel allocation in the HE PPDU frame format according to the present invention.

In the example of FIG. 8, it is assumed that information indicating subchannels to which STAs are allocated in HE PPDU indicates that a subchannel of 0 MHz is allocated to STA1 (i.e., no subchannel is allocated), a subchannel of 5 MHz is allocated to each of STA2 and STA3, and a subchannel of 10 MHz is allocated to STA4.

In the example of FIG. 8, an L-STF, an L-LTF, an L-SIG, and a HE-SIG-A may be transmitted per channel (e.g., 20 MHz), a HE-STF and a HE-LTF may be transmitted on each of subchannels being basic subchannel units (e.g., 5 MHz), and a HE-SIG-B and a PSDU may be transmitted on each of subchannels allocated to STAs. A subchannel allocated to a STA has a size required for PSDU transmission to the STA. The size of the subchannel allocated to the STA may be an N (N=1, 2, 3, . . . ) multiple of the size of the basic subchannel unit (i.e., a minimum-size subchannel unit). In the example of FIG. 8, the size of a subchannel allocated to STA2 is equal to that of the basic subchannel unit, the size of a subchannel allocated to STA3 is equal to that of the basic subchannel unit, and the size of a subchannel allocated to STA4 is twice larger than that of the basic subchannel unit.

FIG. 8 illustrates a plurality of HE-LTF elements and a plurality of HE-LTF subelements which are distinguished in the time and frequency domains. One HE-LTF element may correspond to one OFDM symbol in the time domain and one subchannel unit (i.e., the bandwidth of a subchannel allocated to a STA) in the frequency domain. One HE-LTF subelement may correspond to one OFDM symbol in the time domain and one basic subchannel unit (e.g. 5 MHz) in the frequency domain. In the example of FIG. 8, one HE-LTF element includes one HE-LTF subelement in the 5-MHz subchannel allocated to STA2 or STA3. On the other hand, one HE-LTF element includes two HE-LTF subelements in the third subchannel, i.e., 10-MHz subchannel, allocated to STA4. A HE-LTF element and a HE-LTF subelement are logical units and the PHY layer does not always operate in units of a HE-LTF element or HE-LTF subelement.

A HE-LTF symbol may correspond to a set of HE-LTF elements in one OFDM symbol in the time domain and one channel unit (e.g. 20 MHz) in the frequency domain. That is, one HE-LTF symbol may be divided into HE-LTF elements by a subchannel width allocated to a STA and into HE-LTF subelements by the width of the basic subchannel unit in the frequency domain.

A HE-LTF section may correspond to a set of HE-LTF elements in one or more OFDM symbols in the time domain and one subchannel unit (i.e. the bandwidth of a subchannel allocated to a STA) in the frequency domain. A HE-LTF subsection may correspond to a set of HE-LTF elements in one or more OFDM symbols in the time domain and one basic subchannel unit (e.g., 5 MHz) in the frequency domain. In the example of FIG. 8, one HE-LTF section includes one HE-LTF subsection in the 5-MHz subchannel allocated to STA2 or STA3. On the other hand, one HE-LTF section includes two HE-LTF subsections in the third subchannel, i.e., 10-MHz subchannel, allocated to STA4.

A HE-LTF field may correspond to a set of HE-LTF elements (or subelements), HE-LTF symbols, or HE-LTF sections (or subsections) for a plurality of stations.

For the afore-described HE PPDU transmission, subchannels allocated to a plurality of HE STAs may be contiguous in the frequency domain. In other words, for HE PPDU transmission, the subchannels allocated to the HE STAs may be sequential and any intermediate one of the subchannels of one channel (e.g., 20 MHz) may not be allowed to be unallocated or empty. Referring to FIG. 7, if one channel includes four subchannels, it may not be allowed to keep the third subchannel unallocated and empty, while the first, second, and fourth subchannels are allocated to STAs. However, the present invention does not exclude non-allocation of an intermediate subchannel of one channel to a STA.

Figure 9:
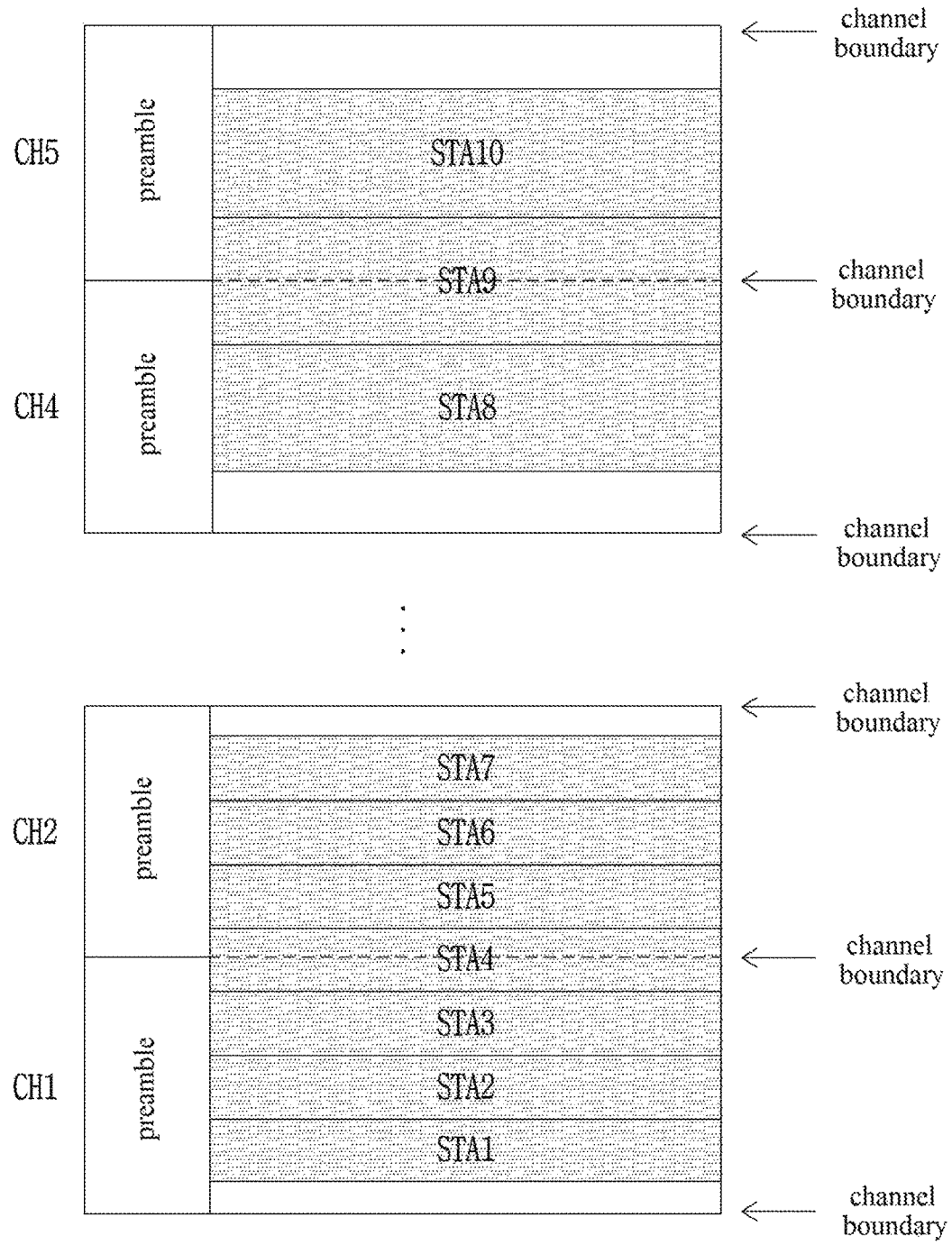
FIG. 9 depicts a subchannel allocation method according to the present invention.

FIG. 9 depicts a subchannel allocation method according to the present invention.

In the example of FIG. 9, a plurality of contiguous channels (e.g., 20-MHz-bandwidth channels) and boundaries of the plurality of contiguous channels are shown. In FIG. 9, a preamble may correspond to an L-STF, an L-LTF, an L-SIG, and a HE-SIG-A as illustrated in the examples of FIGS. 7 and 8.

A subchannel for each HE STA may be allocated only within one channel, and may not be allocated with partially overlapping between a plurality of channels. That is, if there are two contiguous 20-MHz channels CH1 and CH2, subchannels for STAs paired for MU-MIMO-mode or OFDMA-mode transmission may be allocated either within CH1 or within CH2, and it may be prohibited that one part of a subchannel exists in CH1 and another part of the subchannel exists in CH2. This means that one subchannel may not be allocated with crossing a channel boundary. From the perspective of RUs supporting the MU-MIMO or OFDMA mode, a bandwidth of 20 MHz may be divided into one or more RUs, and a bandwidth of 40 MHz may be divided into one or more RUs in each of two contiguous 20-MHz bandwidths, and no RU is allocated with crossing the boundary between two contiguous 20-MHz bandwidths.

As described above, it is not allowed that one subchannel belongs to two or more 20-MHz channels. Particularly, a 2.4-GHz OFDMA mode may support a 20-MHz OFDMA mode and a 40-MHz OFDMA mode. In the 2.4-GHz OFDMA mode, it may not be allowed that one subchannel belongs to two or more 20-MHz channels.

FIG. 9 is based on the assumption that subchannels each having the size of a basic subchannel unit (e.g., 5 MHz) in CH1 and CH2 are allocated to STA1 to STA7, and subchannels each having double the size (e.g., 10 MHz) of the basic subchannel unit in CH4 and CH5 are allocated to STA8, STA9, and STA10.

As illustrated in the lower part of FIG. 9, although a subchannel allocated to STA1, STA2, STA3, STA5, STA6, or STA7 is fully overlapped only with one channel (i.e., without crossing the channel boundary, or belonging only to one channel), a subchannel allocated to STA4 is partially overlapped with the two channels (i.e., crossing the channel boundary, or belonging to the two channels). In the forgoing example of the present invention, the subchannel allocation to STA4 is not allowed.

As illustrated in the upper part of FIG. 9, although a subchannel allocated to STA8 or STA10 is fully overlapped only with one channel (i.e., crossing the channel boundary, or belonging only to one channel), a subchannel allocated to STA9 is partially overlapped with two channels (i.e., crossing the channel boundary, or belonging to the two channels). In the forgoing example of the present invention, the subchannel allocation to STA9 is not allowed.

On the other hand, it may be allowed to allocate a subchannel partially overlapped between a plurality of channels (i.e., crossing the channel boundary, or belonging to two channels). For example, in SU-MIMO mode transmission, a plurality of contiguous channels may be allocated to a STA and any of one or more subchannels allocated to the STA may cross the boundary between two contiguous channels.

While the following description is given with an assumption that one subchannel has a channel bandwidth of 5 MHz in one channel having a channel bandwidth of 20 MHz, this is provided to simplify the description of the principle of the present invention and thus should not be construed as limiting the present invention. For example, the bandwidths of a channel and a subchannel may be defined or allocated as values other than the above examples. In addition, a plurality of subchannels in one channel may have the same or different channel widths.

FIG. 10 depicts the starting and ending points of a HE-LTF field in the HE PPDU frame format according to the present invention.

To support the MU-MIMO mode and the OFDMA mode, the HE PPDU frame format according to the present invention may include, in the HE-SIG-A field, information about the number of spatial streams to be transmitted to a HE STA allocated to each subchannel.

If MU-MIMO-mode or OFDMA-mode transmission is performed to a plurality of HE STAs on one subchannel, the number of spatial streams to be transmitted to each of the HE STAs may be provided in the HE-SIG-A or HE-SIG-B field, which will be described later in detail.

FIG. 10 is based on the assumption that a first 5-MHz subchannel is allocated to STA1 and STA2 and two spatial streams are transmitted to each STA in a DL MU-MIMO or OFDMA mode (i.e., a total of four spatial streams are transmitted on one subchannel). For this purpose, a HE-STF, a HE-LTF, a HE-LTF, a HE-LTF, a HE-LTF, and a HE-SIG-B follow the HE-SIG-A field on the subchannel. The HE-STF is used for frequency offset estimation and phase offset estimation for the 5-MHz subchannel. The HE-LTFs are used for channel estimation for the 5-MHz subchannel. Since the subchannel carries four spatial streams, as many HE-LTFs (i.e., HE-LTF symbols or HE-LTF elements in a HE-LTF section) as the number of the spatial streams, that is, four HE-LTFs are required to support MU-MIMO transmission.

According to an example of the present invention, a relationship between a number of total spatial streams transmitted in one subchannel and a number of HE-LTF are listed in [Table 2].

TABLE 2

| Total number of spatial streams transmitted on one subchannel | Number of HE-LTFs |
| --- | --- |
| 1 | 1 |
| 2 | 2 |
| 3 | 4 |
| 4 | 4 |

TABLE 2-continued

| Total number of spatial streams transmitted on one subchannel | Number of HE-LTFs |
| --- | --- |
| 5 | 6 |
| 6 | 6 |
| 7 | 8 |
| 8 | 8 |

Referring to [Table 2], if one spatial stream is transmitted on one subchannel, at least one HE-LTF needs to be transmitted on the subchannel. If an even number of spatial streams are transmitted on one subchannel, at least as many HE-LTFs as the number of the spatial streams need to be transmitted. If an odd number of spatial streams greater than one are transmitted on one subchannel, at least as many HE-LTFs as a number of adding 1 to the number of the spatial streams need to be transmitted.

Referring to FIG. 10 again, it is assumed that the second 5-MHz subchannel is allocated to STA3 and STA4 and one spatial streams per STA is transmitted in the DL MU-MIMO or OFDMA mode (i.e., a total of two spatial streams are transmitted on one subchannel). In this case, two HE-LTFs need to be transmitted on the second subchannel, however, in the example of FIG. 10, a HE-STF, a HE-LTF, a HE-LTF, a HE-LTF, a HE-LTF, and a HE-SIG-B follow the HE-SIG-A field on the subchannel (i.e., four HE-LTFs are transmitted). This is for setting the same starting time of PSDU transmission for subchannels allocated to other STAs paired with STA3 and STA4 for MU-MIMO transmission. If only two HE-LTFs are transmitted on the second subchannel, PSDUs are transmitted at different time points on the first and second subchannels. PSDU transmission on each subchannel at a different time point results in discrepancy between OFDM symbol timings of subchannels, thereby no orthogonality is maintained. To overcome this problem, an additional constraint need to be imposed for HE-LTF transmission.

Basically, transmission of as many HE-LTFs as required is sufficient in an SU-MIMO or non-OFDMA mode. However, timing synchronization (or alignment) with fields transmitted on subchannels for other paired STAs is required in the MU-MIMO or OFDMA mode. Accordingly, the numbers of HE-LTFs may be determined for all other subchannels based on a subchannel having the maximum number of streams in MU-MIMO-mode or OFDMA-mode transmission.

Specifically, the numbers of HE-LTFs may be determined for all subchannels according to the maximum of the numbers of HE-LTFs (HE-LTF symbols or HE-LTF elements in a HE-LTF section) required according to the total numbers of spatial streams transmitted on each subchannel, for a set of HE STAs allocated to each subchannel A "set of HE STAs allocated to each subchannel" is one HE STA in the SU-MIMO mode, and a set of HE STAs paired across a plurality of subchannels in the MU-MIMO mode. The 'number of spatial streams transmitted on each subchannel' is the number of spatial streams transmitted to one HE STA in the SU-MIMO mode, and the number of spatial streams transmitted to a plurality of HE STAs paired on the subchannel in the MU-MIMO mode.

That is, it may be said that a HE-LTF field starts at the same time point and ends at the same time point in a HE PPDU for all users (i.e. HE STAs) in MU-MIMO-mode or OFDMA-mode transmission. Or it may be said that the lengths of HE-LTF sections are equal on a plurality of subchannels for all users (i.e. HE STAs) in MU-MIMO-mode or OFDMA-mode transmission. Or it may be said that the number of HE-LTF elements included in each HE-LTF section is equal on a plurality of subchannels for all users (i.e. HE STAs) in MU-MIMO-mode or OFDMA-mode transmission. Accordingly, PSDU transmission timings may be synchronized among a plurality of subchannels for all HE STAs in MU-MIMO-mode or OFDMA-mode transmission.

As described above, the number of HE-LTF symbols (refer to FIG. 7) may be 1, 2, 4, 6, or 8 in HE PPDU transmission in the MU-MIMO or OFDMA mode, determined according to the maximum of the numbers of spatial streams on each of a plurality of subchannels. A different number of spatial streams may be allocated to each of a plurality of subchannels, and the number of spatial streams allocated to one subchannel is the number of total spatial streams for all users allocated to the subchannel. That is, the number of HE-LTF symbols may be determined according to the number of spatial streams allocated to a subchannel having a maximum number of spatial streams by comparing the number of total spatial streams for all users allocated to one of a plurality of subchannels with the number of total spatial streams for all users allocated to another subchannel.

Specifically, in HE PPDU transmission in the OFDMA mode, the number of HE-LTF symbols may be 1, 2, 4, 6, or 8, determined based on the number of spatial streams transmitted in a subchannel having a maximum number of spatial streams across a plurality of subchannels. Further, in HE PPDU transmission in the OFDMA mode, the number of HE-LTF symbols may be determined based on whether the number of spatial streams transmitted in a subchannel having a maximum number of spatial streams across a plurality of subchannels is odd or even (refer to [Table 2]). That is, in HE PPDU transmission in the OFDMA mode, when the number (e.g., K) of spatial streams transmitted in a subchannel having a maximum number of spatial streams across a plurality of subchannels is an even number, the number of HE-LTF symbols may be equal to K. In HE PPDU transmission in the OFDMA mode, when the number, K, of spatial streams transmitted in a subchannel having a maximum number of spatial streams across a plurality of subchannels is an odd number greater than one, the number of HE-LTF symbols may be equal to K+1.

When only one STA is allocated to one subchannel in OFDMA mode (i.e., OFDMA mode without using MU-MIMO), a subchannel having a maximum number of spatial streams across a plurality of subchannels may be determined by the number of spatial streams for a STA allocated to each subchannel. When more than one STA is allocated to one subchannel in OFDMA mode (i.e., OFDMA mode using MU-MIMO), a subchannel having a maximum number of spatial streams across a plurality of subchannels may be determined by the number of STAs allocated to each subchannel and the number of spatial streams for each STA allocated to each subchannel (e.g., if STA1 and STA2 are allocated to one subchannel, sum of the number of spatial streams for STA1 and the number of spatial streams for STA2).

When transmitting a HE PPDU frame in the MU-MIMO or OFDMA mode, a transmitter may generate P (P is an integer equal to or larger than 1) HE-LTF symbols (refer to FIG. 7) and transmit a HE PPDU frame including at least the P HE-LTF symbols and a Data field to a receiver. The HE PPDU frame may be divided into Q subchannels in the frequency domain (Q is an integer equal to or larger than 2). Each of the P HE-LTF symbols may be divided into Q HE-LTF elements corresponding to the Q subchannels in the frequency domain. That is, the HE PPDU may include P HE-LTF elements on one subchannel (herein, the P HE-LTF elements may belong to one HE-LTF section on the subchannel).

As described above, the number of HE-LTF elements (i.e., P) in one of the Q subchannels may be equal to the number of HE-LTF elements (i.e. P) of another subchannel. Also, the number of HE-LTF elements (i.e., P) included in a HE-LTF section in one of the Q subchannels may be equal to the number of HE-LTF elements (i.e. P) included in a HE-LTF section in another subchannel. The HE-LTF section of one of the Q subchannels may start and end at the same time points as the HE-LTF section of another subchannel. Also, the HE-LTF sections may start and end at the same time points across the Q subchannels (i.e., across all users or stations).

Referring to FIG. 10 again, the third 5-MHz subchannel is allocated to STA5 and one spatial stream is transmitted on the subchannel in SU-MIMO (considering all subchannels, a plurality of spatial streams are transmitted to STA1 to STA6 in MU-MIMO or OFDMA mode). In this case, although transmission of one HE-LTF is sufficient for the subchannel, as many HE-LTFs as the maximum of the numbers of HE-LTFs on the other subchannels, that is, four HE-LTFs are transmitted on the subchannel in order to align the starting points and ending points of the HE-LTF fields of the subchannels.

The fourth 5-MHz subchannel is allocated to STA6 and one spatial stream is transmitted on the subchannel in SU-MIMO (considering all other subchannels, a plurality of spatial streams are transmitted to STA1 to STA6 in MU-MIMO or OFDMA mode). In this case, although transmission of one HE-LTF is sufficient for the subchannel, as many HE-LTFs as the maximum of the numbers of HE-LTFs on the other subchannels, that is, four HE-LTFs are transmitted on the subchannel in order to align the starting points and ending points of the HE-LTF fields of the subchannels.

In the example of FIG. 10, the remaining two HE-LTFs except two HE-LTFs required for channel estimation of STA3 and STA4 on the second subchannel, the remaining three HE-LTFs except one HE-LTF required for channel estimation of STA5 on the third subchannel, and the remaining three HE-LTFs except one HE-LTF required for channel estimation of STA6 on the fourth subchannel may be said to be placeholders that are actually not used for channel estimation at the STAs.

FIG. 11 depicts a HE-SIG-B field and a HE-SIG-C field in the HE PPDU frame format according to the present invention.

To effectively support MU-MIMO-mode or OFDMA-mode transmission in the HE PPDU frame format according to the present invention, independent signaling information may be transmitted on each subchannel. Specifically, a different number of spatial streams may be transmitted to each of a plurality of HE STAs that receive an MU-MIMO-mode or OFDMA-mode transmission simultaneously. Therefore, information about the number of spatial streams to be transmitted should be indicated to each HE STA.

Information about the number of spatial streams on one channel may be included in, for example, a HE-SIG-A field. A HE-SIG-B field may include spatial stream allocation information about one subchannel. Also, a HE-SIG-C field may be transmitted after transmission of HE-LTFs, including MCS information about a PSDU and information about the length of the PSDU, etc.

With reference to the foregoing examples of the present invention, mainly the features of a HE PPDU frame structure applicable to a DL MU-MIMO-mode or OFDMA-mode transmission that an AP transmits simultaneously to a plurality of STAs have been described. Now, a description will be given of the features of a HE PPDU frame structure applicable to a UL MU-MIMO-mode or OFDMA-mode transmission that a plurality of STAs transmits simultaneously to an AP.

The above-described various examples of structures of the HE PPDU frame format supporting MU-MIMO-mode or OFDMA-mode transmission are not applicable only to DL but also applicable UL. For example, the above-described exemplary HE PPDU frame formats may also be used for a UL HE PPDU transmission that a plurality of STAs simultaneously transmits to a single AP.

However, in the case of a DL MU-MIMO-mode or OFDMA-mode HE PPDU transmission that an AP simultaneously transmits to a plurality of STAs, the transmission entity, AP has knowledge of the number of spatial streams transmitted to a HE STA allocated to each of a plurality of subchannels. Therefore, the AP may include, in a HE-SIG-A field or a HE-SIG-B field, information about the total number of spatial streams transmitted across a channel, a maximum number of spatial streams (i.e., information being a basis of the number of HE-LTF elements (or the starting point and ending point of a HE-LTF section) on each subchannel), and the number of spatial streams transmitted on each subchannel. In contrast, in the case of a UL MU-MIMO-mode or OFDMA-mode HE PPDU transmission that a plurality of STAs simultaneously transmits to an AP, each STA being a transmission entity may be aware only of the number of spatial streams in a HE PSDU that it will transmit, without knowledge of the number of spatial streams in a HE PSDU transmitted by another STA paired with the STA. Accordingly, the STA may determine neither the total number of spatial streams transmitted across a channel nor a maximum number of spatial streams.

To solve this problem, a common parameter (i.e., a parameter applied commonly to STAs) and an individual parameter (a separate parameter applied to an individual STA) may be configured as follows in relation to a UL HE PPDU transmission.

For simultaneous UL HE PPDU transmissions from a plurality of STAs to an AP, a protocol may be designed in such a manner that the AP sets a common parameter or individual parameters (common/individual parameters) for the STAs for the UL HE PPDU transmissions and each STA operates according to the common/individual parameters. For example, the AP may transmit a trigger frame (or polling frame) for a UL MU-MIMO-mode or OFDMA-mode transmission to a plurality of STAs. The trigger frame may include a common parameter (e.g., the number of spatial streams across a channel or a maximum number of spatial streams) and individual parameters (e.g., the number of spatial streams allocated to each subchannel), for the UL MU-MIMO-mode or OFDMA-mode transmission. As a consequence, a HE PPDU frame format applicable to a UL MU-MIMO or OFDMA mode may be configured without a modification to an exemplary HE PPDU frame format applied to a DL MU-MIMO or OFDMA mode. For example, each STA may configure a HE PPDU frame format by including information about the number of spatial streams across a channel in a HE-SIG-A field, determining the number of HE-LTF elements (or the starting point and ending point of a HE-LTE section) on each subchannel according to the maximum number of spatial streams, and including information about the number of spatial streams for the individual STA in a HE-SIG-B field.

Alternatively, if the STAs operate always according to the common/individual parameters received in the trigger frame from the AP, each STA does not need to indicate the common/individual parameters to the AP during a HE PPDU transmission. Therefore, this information may not be included in a HE PPDU. For example, each STA may have only to determine the total number of spatial streams, the maximum number of spatial streams, and the number of spatial streams allocated to individual STA, as indicated by the AP, and configure a HE PPDU according to the determined numbers, without including information about the total number of spatial streams or the number of spatial streams allocated to the STA in the HE PPDU.

On the other hand, if the AP does not provide common/individual parameters in a trigger frame, for a UL MIMO-mode or OFDMA-mode HE PPDU transmission, the following operation may be performed.

Common transmission parameters (e.g., channel Bandwidth (BW) information, etc.) for simultaneously transmitted HE PSDUs may be included in HE-SIG-A field, but parameters that may be different for individual STAs (e.g., the number of spatial streams, an MCS, and whether STBC is used or not, for each individual STA) may not be included in HE-SIG-A field. Although the individual parameters may be included in HE-SIG-B field, information about the number of spatial streams and information indicating whether STBC is used or not, need to be transmitted before a HE-LTF field because the number of spatial streams and the information indicating whether STBC is used or not are significant to determination of configuration information about a preamble and a PSDU in a HE PPDU frame format (e.g., the number of HE-LTF elements is determined according to a combination of the number of spatial streams and the information indicating whether STBC is used or not). For this purpose, a HE PPDU frame format as illustrated in FIG. 12 may be used for a UL HE PPDU transmission.

FIG. 12 depicts another exemplary HE PPDU frame format according to the present invention. The HE PPDU frame format illustrated in FIG. 12 is characterized in that a structure of HE-SIG-A, HE-SIG-B, and HE-SIG-C fields similar to in FIG. 10 is used for a UL PPDU transmission.

As described before, if a UL MU-MIMO-mode or OFDMA-mode transmission is performed by triggering of an AP (according to common/individual parameters provided by the AP), an individual STA may not need to report an individual parameter to the AP. In this case, one or more of a HE-SIG-B field, a HE-SIG-C field, and a first HE-LTF element (i.e., a HE-LTF between a HE-STF field and a HE-SIG-B field) illustrated in FIG. 12 may not exist. In this case, a description of each field given below may be applied only in the presence of the field.

In the example of FIG. 12, a HE-SIG-A field is transmitted per channel (i.e., per 20-MHz channel) and may include transmission parameters common to simultaneously transmitted HE PSDUs. Since the same information is transmitted in up to HE-SIG-A fields in UL PPDUs transmitted by HE STAs allocated to subchannels, the AP may receive the same signals from the plurality of STAs successfully.

A HE-SIG-B field is transmitted per subchannel in one channel. The HE-SIG-B field may have an independent parameter value according to the transmission characteristics of a HE PSDU transmitted on each subchannel. The HE-SIG-B field may include spatial stream allocation information and information indicating whether STBC is used or not, for each subchannel. If MU-MIMO is applied to a subchannel (i.e., if a plurality of STAs perform transmission on a subchannel), the HE-SIG-B field may include a common parameter for the plurality of STAs paired on the subchannel.

A HE-SIG-C field is transmitted on the same subchannel as the HE-SIG-B field and may include information about an MCS and a packet length. If MU-MIMO is applied to a subchannel (i.e., if a plurality of STAs perform transmission on a subchannel), the HE-SIG-C field may include respective individual parameters for each of the plurality of STAs paired on the subchannel.

Similarly to DL MU-MIMO-mode or OFDMA-mode HE PPDU transmission, transmissions of PSDUs may start at different time points on subchannels in UL MU-MIMO-mode or OFDMA-mode HE PPDU transmission, and if OFDM symbols are not aligned accordingly, then the implementation complexity of an AP that receives a plurality of PSDUs increased. To solve this problem, 'the number of HE-LTFs may be determined for all subchannels according to the maximum of the numbers of HE LTFs required according to the total numbers of spatial streams transmitted on each subchannel for a set of HE STAs allocated to each of subchannels' as described with reference to the example of FIG. 10.

This feature may mean that the HE-LTF field start at the same time point and end at the same time point across all users (i.e., HE STAs) in UL MU-MIMO-mode or OFDMA-mode transmission. Or it may be said that the HE-LTF sections of a plurality of subchannels have the same length across all HE STAs in UL MU-MIMO-mode or OFDMA-mode transmission. Or it may be said that each of the HE-LTF sections of a plurality of subchannels includes the same number of HE-LTF elements across all HE STAs in UL MU-MIMO-mode or OFDMA-mode transmission. Therefore, PSDU transmission timings are synchronized between a plurality of subchannels across all HE STAs in UL MU-MIMO-mode or OFDMA-mode transmission.

As described before, a plurality of STAs may simultaneously transmit PSDUs in a HE PPDU frame format to an AP on subchannels allocated to the STAs (i.e., referred to as UL MU-MIMO or OFDMA transmission or "UL MU transmission"), and a plurality of STAs may simultaneously receive a PSDU in a HE PPDU frame format from an AP on subchannels allocated to the STAs (i.e., referred to as DL MU-MIMO or OFDMA transmission or "DL MU transmission").

Configurations of HE-LTFs, Configuration of data units (e.g., PSDUs), and paddings applied to a DL/UL MU HE PPDU according to the present invention will be described below.

Although a DL/UL MU PPDU supports simultaneous transmission to/from a plurality of STAs, data transmitted to/from the STAs may have different lengths. If different subchannels (or resource units) are allocated to the plurality of STAs and the STAs are allowed to terminate DL/UL transmissions at different time points on the different subchannels, another device may access a subchannel on which transmission has been terminated early, thereby making it impossible to protect DL/UL MU transmission.

Further, an STA/AP that receives DL/UL data in a DL/UL MU PPDU may process (e.g., decode) received data within a predetermined time (e.g., an SIFS) after the data reception and transmit an ACK for the received data. Since the DL/UL MU PPDU may include a large amount of data in a frame, the STA/AP may have difficulty in generating and transmitting an ACK within the predetermined time (e.g., the SIFS).

Accordingly, the DL/UL MU transmission should be terminated simultaneously on the subchannels allocated to the plurality of STAs in the DL/UL MU PPDU. For this purpose, a padding may be applied to the DL/UL MU PPDU in the present invention. Because the padding corresponds to a non-data transmission time period (i.e., a time period over which no actual data to be received is transmitted to a receiver of the DL/UL MU PPDU), the padding may be applied for the purpose of securing a time for processing data in the STA/AP receiving the DL/UL MU PPDU. A description will be given of padding schemes applied to configurations of data units (e.g., PSDUs) and configurations of HE-LTFs based on which a padding is applied in a DL/UL MU PPDU according to the present invention.

Particularly, a description will be given of padding schemes applied to configurations of HE-LTFs and configurations of data units (e.g. padding applying schemes) for a HE PPDU, taking into account whether STBC is applied to the HE PPDU.

STBC is a coding scheme that provides time diversity by repeating the same data symbol in the time domain, while supporting orthogonality in a wireless communication system. Since a transmitter transmits one data stream repeatedly through a plurality of antennas, a receiver may acquire a plurality of reception versions of one data, thereby increasing the reliability of data transmission using the plurality of reception versions. A transmitted signal may be distorted because it experiences various distortion environments such as distribution, reflection, deflection, etc. Further, the transmitted signal may also be distorted due to thermal noise at the receiver. Since a plurality of reception versions of one data stream experience different distortions, some of the versions may be less distorted than other versions. The possibility of decoding the received signal successfully using the redundancy of the plurality of reception versions is increased. In this manner, as much information as possible may be extracted by combining a plurality of versions of a received signal in an optimal manner according to the STBC scheme.

In a WLAN system, STBC may be used to extend Space Streams (SSs) to twice as many Space-Time Streams (STSs) as the SSs. For example, STBC may be used to extend 1, 2, 3, and 4 SSs to 2, 4, 6, and 8 STSs, respectively. To provide a maximum transmit diversity gain with low system complexity, an Alamouti scheme may be used. In a system supporting 1 to 4 SSs, each SS may be extended individually using an Alamouti code. Specifically in regard to input symbols $x_1$ and $x_2$ in the time domain, $x_1$ and $x_2$ are transmitted in the original order in a first SS and space-time coded $x_2^*$ and $x_1^*$ are transmitted in a second SS ($x^*$ is a conjugate of x). Accordingly, the output of the transmitter may be expressed as [Equation 1].

$$y_1 = \begin{bmatrix} x_1 \\ -x_2^* \end{bmatrix}, \quad y_2 = \begin{bmatrix} x_2 \\ x_1^* \end{bmatrix} \qquad \text{[Equation 1]}$$

The received symbols may be given as [Equation 2]

$$r_1 = [h_{11} \ h_{12}] \cdot \begin{bmatrix} x_1 \\ -x_2^* \end{bmatrix} + n_1, \qquad \text{[Equation 2]}$$

$$r_2 = [h_{21} \ h_{22}] \cdot \begin{bmatrix} x_2 \\ x_1^* \end{bmatrix} + n_2$$

The receiver may recover the transmitted data by linearly processing the transmitted data. Since the Alamouti code has low complexity with a maximum diversity gain, the Alamouti code may be more favorable even though other higher-order STBC codes offer low Bit Error Rates (BERs).

STBC may also be applied to a HE PPDU frame format proposed by the present invention. If a HE PPDU frame is transmitted on a transmission channel divided into a plurality of subchannels, the plurality of subchannels may be allocated to a plurality of STAs so that transmissions to/from the plurality of STAs may be performed simultaneously on the plurality of subchannels.

If STBC is applied to this RE PPDU frame format, STBC may or may not be applied uniformly to a plurality of subchannels (or a plurality of PSDUs transmitted on the plurality of subchannels). That is, STBC may be applied to all or none of the plurality of subchannels (or the plurality of simultaneously transmitted PSDUs). Or although STBC may be applied to a part of the plurality of subchannels (or the plurality of simultaneously transmitted PSDUs), STBC may not be applied to the other subchannels. In consideration of such various STBC applications for a HE PPDU, specific exemplary HE-LTF configurations and data unit configurations (e.g., padding applications) for a RE PPDU according to the present invention will be described below.

Figure 13:
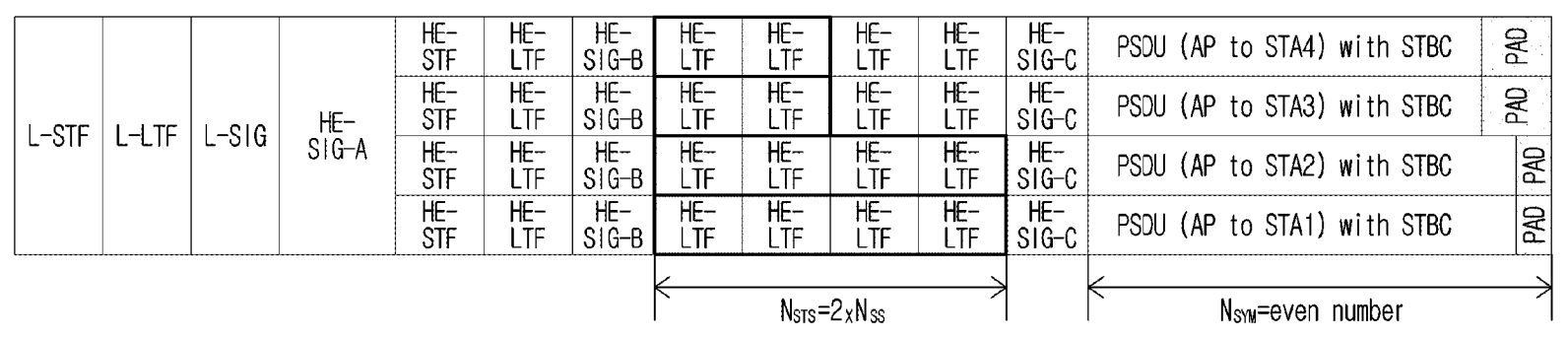
Figure 14:
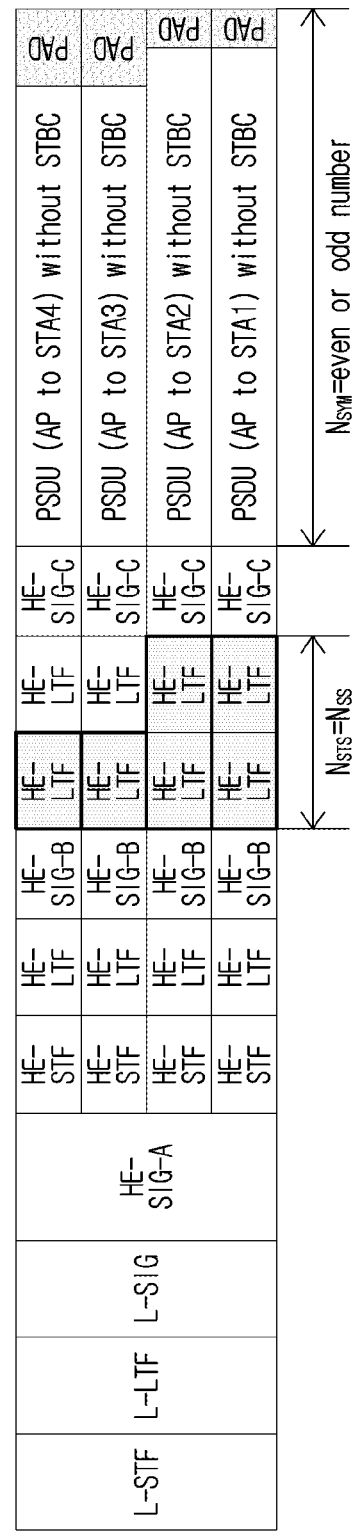

FIGS. 13 and 14 depict exemplary HE-LTF configurations and data unit configurations for a HE PPDU according to the present invention.

In FIGS. 13 and 14, STBC is applied to all or none of a plurality of subchannels (or a plurality of simultaneously transmitted data units (e.g., PSDUs)). This is called homogeneous STBC herein. As illustrated in FIG. 13, STBC may be applied to all data units simultaneously transmitted on a plurality of subchannels, when STBC is applied to a HE PPDU format. Or as illustrated in FIG. 14, STBC may be applied to none of data units simultaneously transmitted on a plurality of subchannels, when STBC is not applied to a HE PPDU format. Information indicating whether STBC is applied to a plurality of subchannels in a HE PPDU may be included in a HE-SIG field transmitted on each of the plurality of subchannels.

A data unit transmitted on one subchannel to which STBC is applied may be destined for one STA. That is, it is assumed that in the case where data units are transmitted to a plurality of STAs on one subchannel in DL/UL MU-MIMO, STBC cannot be applied to the subchannel. That is, to apply STBC to one subchannel, a data unit transmitted on the subchannel should be destined for one STA. In this case, in a homogeneous STBC HE PPDU format, DL/UL MU-MIMO transmission for a plurality of STAs may not be allocated to any subchannel.

In the following examples, $N_{SS}$ is the number of SSs, $N_{STS}$ is the number of STSs, and $N_{SYM}$ is the total number of data symbols transmitted in a data field of a PPDU (or an OFDM symbol duration of the data field). $N_{SYM}$ may be defined as [Equation 3].

$$N_{SYM} = m_{STBC} \times \left\lceil \frac{8 \cdot \text{APEP\_LENGTH} + N_{service} + N_{tail} \cdot N_{ES}}{m_{STBC} \cdot N_{DEPS}} \right\rceil \qquad \text{[Equation 3]}$$

In [Equation 3], if STBC is used, $m_{STBC}$ is 2 and otherwise, $m_{STBC}$ is 1. APEP_LENGTH is a parameter given by a transmission vector, which is a length set based on an average packet error probability. $N_{service}$ is the length of a SERVICE field of a PPDU Data field. $N_{tail}$ is the length of a PPDU TAIL field of the PPDU Data field. $N_{ES}$ is the number encoders applied to the PPDU Data field. $N_{DBPS}$ is the number of data bits per symbol. Further, ⌈ ⌉ represents a ceiling operation, and ⌈x⌉ represents the least integer equal to or larger than x.

In the example of FIG. 13, it is assumed that STBC is applied to HE PPDU transmission and an AP simultaneously transmits a plurality of data units to STA1, STA2, STA3, and STA4. That is, data units to which SBC is applied may be transmitted to STA1, STA2, STA3, and STA4 on respective subchannels allocated to STA1, STA2, STA3, and STA4.

In the example of FIG. 13, it is assumed that two SSs ($N_{SS}$=2) are used for the data unit transmitted to STA1, two SSs ($N_{SS}$=2) are used for the data unit transmitted to STA2, one SS ($N_{SS}$=1) is used for the data unit transmitted to STA3, and one SS ($N_{SS}$=1) is used for the data unit transmitted to STA4. If STBC is applied, the number of STSs, $N_{STS}$ is 2×$N_{SS}$ for each STA (or each subchannel). That is, $N_{STS}$ is 4, 4, 2, and 2, respectively for STA1, STA2, STA3, and STA4. Therefore, the numbers of HE-LTF elements required for STA1, STA2, STA3, and STA4 are respectively 4, 4, 2, and 2. As described before with reference to the foregoing example of the present invention, 4 HE-LTF elements may be used equally for each of all subchannels (or all STAs) so that the numbers of HE-LTF elements (or the lengths of HE-LTF sections) may be equal (may be aligned) across the plurality of subchannels. In other words, the same even number of HE-LTF elements (or the same even-numbered HE-LTF OFDM symbol duration or the same even number of HE-LTF OFDM symbols) may be determined for a plurality of subchannels in a HE PPDU to which STBC is applied.

In addition, data units to be transmitted on the plurality of subchannels may have different lengths. However, paddings may be added to the subchannels so that the DL/UL MU transmissions may end at the same time point on the subchannels allocated to the plurality of STAs in the HE PPDU. For this purpose, a common $N_{SYM}$ value may be applied to the plurality of subchannels (or the plurality of STAs) in the example of FIG. 13. That is, although the data units have different lengths for the plurality of subchannels (or the plurality of STAs), the lengths (i.e., $N_{SYM}$) of PPDU data fields including paddings may be equal for the plurality of subchannels (or the plurality of STAs). That is, one $N_{SYM}$ value may be applied commonly to the plurality of subchannels (or the plurality of STAs), and may be determined based on the longest of the data units transmitted on the plurality of subchannels (or to the plurality of STAs).

In addition, as illustrated in the example of FIG. 13, $N_{SYM}$ applied commonly to the plurality of subchannels (or the plurality of STAs) in the HE PPDU to which STBC is applied may be determined so that the OFDM symbol duration (or the number of OFDM symbols) may be an even number. If a data unit on a subchannel is shorter than data units on other subchannels and thus is added with a padding, the padding may have a length that leads to an even-numbered OFDM symbol duration (or an event number of OFDM symbols).

Further, a padding according to the present invention may be applied individually to each subchannel (or resource unit) of a DL/UL MU PPDU. For example, a plurality of subchannels allocated in one transmission channel (e.g., a 20-MHz bandwidth) may be allocated to a plurality of STAs. In addition, while a padding may be applied to a first channel, a padding may not be applied to a second channel (i.e., a padding of length 0 may be applied to the second channel) in the DL/UL MU PPDU. Further, even though a padding is applied to each of the plurality of subchannels in the DL/UL MU PPDU, the size of padding bits on the first channel may be much different from the size of padding bits on the second subchannel. The lengths of paddings applied individually to the plurality of subchannels may be determined in such a manner that the data fields of the plurality of subchannels may end at the same time point in the DL/UL MU PPDU.

Further, paddings may be applied to all of the plurality of subchannels. That is, a padding of a length exceeding 0 may also be applied to a subchannel having a longest data unit among the plurality of subchannels. In this case, the padding applied to the subchannel having the longest data unit may be shorter than the paddings applied to the other subchannels.

The example of FIG. 14 is based on the assumption that STBC is not applied to HE PPDU transmission and the AP simultaneously transmits a plurality of data units to STA1, STA2, STA3, and STA4. That is, data units without STBC may be transmitted to STA1, STA2, STA3, and STA4 on subchannels allocated to STA1, STA2, STA3, and STA4.

In the example of FIG. 14, it is assumed that the numbers $N_{SS}$ of SSs in the data units transmitted to STA1, STA2, STA3, and STA4 are respectively 2, 2, 1, and 1. Because STBC is not applied, the numbers of HE-LTF elements required for STA1, STA2, STA3, and STA4 are respectively 2, 2, 1, and 1. As described in the foregoing example of the present invention, two HE-LTF elements may be transmitted uniformly on each of all subchannels (or to all STAs) in order to make the numbers of HE-LTF elements (or the lengths of HE-LTF sections) equal (or aligned) across the plurality of subchannels. In the example without SBC in FIG. 14, the length of HE-LTFs is reduced to a half in the HE PPDU, relative to the length of HE-LTFs in the example with SBC in FIG. 13. The length of HE-LTF elements (or a HE-LTF OFDM symbol duration or the number of HE-LTF OFDM symbols) may be determined to be an even number or odd number for each of the plurality of subchannels in the HE PPDU without STBC (i.e., if $N_{SS}$ is also an odd number (e.g., 1) for STA1 and STA2, the number of HE-LTFs in the HE PPDU is also an odd number (e.g., 1)).

In addition, data units to be transmitted on the plurality of subchannels may have different lengths. However, paddings may be added to the subchannels so that the DL/UL MU transmission may end at the same time point on the subchannels allocated to the plurality of STAs in the HE PPDU. For this purpose, a common $N_{SYM}$ value may also be applied to the plurality of subchannels (or the plurality of STAs) in the example of FIG. 14. That is, although the data units have different lengths on the plurality of subchannels (or for the plurality of STAs), the lengths (i.e., $N_{SYM}$) of PPDU data fields including paddings may be equal for the plurality of subchannels (or the plurality of STAs). That is, one $N_{SYM}$ value may be applied commonly to the plurality of subchannels (or the plurality of STAs), and may be determined based on the longest of the data units transmitted on the plurality of subchannels (or to the plurality of STAs).

In addition, as illustrated in the example of FIG. 14, $N_{SYM}$ applied commonly to the plurality of subchannels (or the plurality of STAs) in the HE PPDU to which STBC is not applied may be determined so that the OFDM symbol duration (or the number of OFDM symbols) may be an even number or an odd number. If a data unit on a subchannel is shorter than data units on other subchannels and thus is added with a padding, the padding may have a length that leads to an even-numbered or odd-numbered OFDM symbol duration (or an even number or odd number of OFDM symbols).

Further, a padding according to the present invention may be applied individually to each subchannel (or resource unit) of a DL/UL MU PPDU. For example, a plurality of subchannels allocated in one transmission channel (e.g., a 20-MHz bandwidth) may be allocated to a plurality of STAs. In addition, while a padding may be applied to a first channel, a padding may not be applied to a second channel (i.e., a padding of length 0 may be applied to the second channel) in the DL/UL MU PPDU. Further, even though a padding is applied to each of the plurality of subchannels in the DL/UL MU PPDU, the size of padding bits on the first channel may be much different from the size of padding bits on the second subchannel. The lengths of paddings applied individually to the plurality of subchannels may be determined in such a manner that the data fields of the plurality of subchannels may end at the same time point in the DL/UL MU PPDU.

Further, paddings may be applied to all of the plurality of subchannels. That is, a padding of a length exceeding 0 may also be applied to the subchannel having the longest data unit among the plurality of subchannels. In this case, the padding applied to the subchannel having the longest data unit may be shorter than the paddings applied to the other subchannels.

Figure 15:
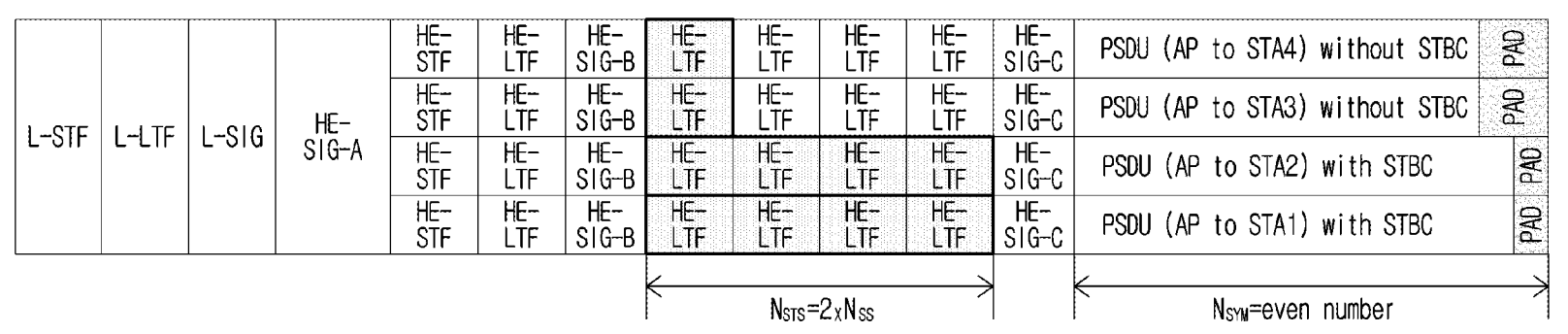

FIG. 15 depicts another exemplary HE PPDU padding according to the present invention.

Compared to FIGS. 13 and 14 illustrating exemplary homogeneous STBC HE PPDUs, FIG. 15 illustrates an exemplary heterogeneous STBC HE PPDU. That is, it may be determined individually for a plurality of subchannels (or a plurality of simultaneously transmitted data units (e.g., PSDUs) whether to apply STBC. That is, although STBC is applied to a first subchannel, STBC may not be applied to a second subchannel in a HE PPDU transmitted on a transmission channel divided into a plurality of subchannels. Information indicating whether to apply STBC to a plurality of subchannels in a HE PPDU may be included in a HE-SIG field transmitted on each of the plurality of subchannels.

A data unit transmitted on one subchannel to which STBC is applied may be destined for one STA. That is, in the case where data units are transmitted to a plurality of STAs on one subchannel in DL/UL MU-MIMO, it is assumed that STBC cannot be applied to the subchannel. That is, to apply STBC to one subchannel, a data unit transmitted on the subchannel should be destined for one STA. In this case, in a heterogeneous STBC HE PPDU format, whether to apply DL/UL MU-MIMO transmission for a plurality of STAs may be determined differently for the plurality of individual subchannels.

In the example of FIG. 15, it is assumed that whether to apply STBC is determined differently for a plurality of subchannels in a HE PPDU and the AP simultaneously transmits a plurality of data units to STA1, STA2, STA3, and STA4. That is, data units to which STBC is applied may be transmitted to STA1 and STA2 on subchannels allocated to STA1 and STA2, whereas data units to which STBC is not applied may be transmitted to STA3 and STA4 on subchannels allocated to STA3 and STA4.

In the example of FIG. 15, it is assumed that the numbers $N_{SS}$ of SSs in the data units transmitted to STA1, STA2, STA3, and STA4 are 2, 2, 1, and 1, respectively. When STBC is applied, the number $N_{STS}$ of STSs is $2 \times N_{SS}$ for each STA (or each subchannel). That is, $N_{STS}$ is 4 and 4 respectively for STA1 and STA2. Accordingly, the numbers of HE-LTF elements required for STA1, STA2, STA3, and STA4 are respectively 4 and 4. On the other hand, since STBC is not applied to STA3 and STA4, the numbers of HE-LTF elements required for STA3 and STA4 are 1 and 1, respectively. Accordingly, the numbers of HE-LTF elements required for STA1, STA2, STA3, and STA4 are 4, 4, 1, and 1, respectively. As described before with reference to the foregoing example of the present invention, 4 HE-LTF elements may be used equally for each of all subchannels (or all STAs) so that the numbers of HE-LTF elements (or the lengths of HE-LTF sections) may be equal (may be aligned) across a plurality of subchannels. In other words, if STBC is applied to at least one of the plurality of subchannels in the HE PPDU, the same even number of HE-LTF elements (or the same even-numbered HE-LTF OFDM symbol duration or the same even number of HE-LTF OFDM symbols) may be determined for the plurality of subchannels in the HE PPDU.

In addition, data units to be transmitted on the plurality of subchannels may have different lengths. However, paddings may be added to the subchannels so that DL/UL MU transmissions may end at the same time on the subchannels allocated to the plurality of STAs in the HE PPDU. For this purpose, a common $N_{SYM}$ value may also be applied to the plurality of subchannels (or the plurality of STAs) in the example of FIG. 15. That is, although the data units have different lengths on the plurality of subchannels (or for the plurality of STAs), the lengths (i.e., $N_{SYM}$) of PPDU data fields including paddings may be equal for the plurality of subchannels (or the plurality of STAs). That is, one $N_{SYM}$ value may be applied commonly to the plurality of subchannels (or the plurality of STAs), and may be determined based on the longest of the data units transmitted on the plurality of subchannels (or to the plurality of STAs).

In addition, as illustrated in the example of FIG. 15, $N_{SYM}$ applied commonly to the plurality of subchannels (or the plurality of STAs) in the HE PPDU to which STBC is applied may be determined so that the OFDM symbol duration (or the number of OFDM symbols) may be an even number. Therefore, if STBC is applied to at least one subchannel (or STA) in the HE PPDU, $N_{SYM}$ applied commonly to the plurality of subchannels (or the plurality of STAs) in the HE PPDU may be determined so that the OFDM symbol duration (or the number of OFDM symbols) may be an even number. That is, if STBC is applied to at least one of the plurality of subchannels (or STAs), $N_{SYM}$ may also be determined for subchannels (or STAs) to which STBC is not applied, so that the OFDM symbol duration (or the number of OFDM symbols) may be an even number.

In addition, with respect to a pre-padding state in the HE PPDU, a data field of a subchannel without STBC may be as long as or shorter than a data field of a subchannel with STBC. Otherwise, the length of the data field of the subchannel with STBC may be matched to the length of the data field of the subchannel without STBC by adding a padding to the data field of the subchannel with STBC. Then, the length of the data field of the subchannel with STBC, added with a padding, includes an odd-numbered OFDM symbol duration because this does not match the property of STBC (i.e., the property of coding data across two time resources (i.e., OFDM symbols)).

As described above, $N_{SYM}$ applied commonly to the plurality of subchannels (or the plurality of STAs) may be determined so that the OFDM symbol duration (or the number of OFDM symbols) may be an even number in the example of FIG. 15. If a data unit on a subchannel is shorter than data units on other subchannels and thus is added with a padding, the padding may have a length that leads to an even-numbered OFDM symbol duration (or an even number of OFDM symbols) in the data field added with the padding.

Further, a padding according to the present invention may be applied individually to each subchannel (or resource unit) of a DL/UL MU PPDU. For example, a plurality of subchannels allocated in one transmission channel (e.g., a 20-MHz bandwidth) may be allocated to a plurality of STAs. In addition, while a padding may be applied to a first channel, a padding may not be applied to a second channel (i.e., a padding of length 0 may be applied to the second channel) in the DL/UL MU PPDU. Further, even though a padding is applied to each of the plurality of subchannels in the DL/UL MU PPDU, the size of padding bits on the first channel may be much different from the size of padding bits on the second subchannel. The lengths of paddings applied individually to the plurality of subchannels may be determined in such a manner that the data fields of the plurality of subchannels may end at the same time point in the DU/UL MU PPDU.

Further, paddings may be applied to all of the plurality of subchannels. That is, a padding of a length exceeding 0 may also be applied to a subchannel having a longest data unit among the plurality of subchannels. In this case, the padding applied to the subchannel having the longest data unit may be shorter than the paddings applied to the other subchannels.

Figure 16:
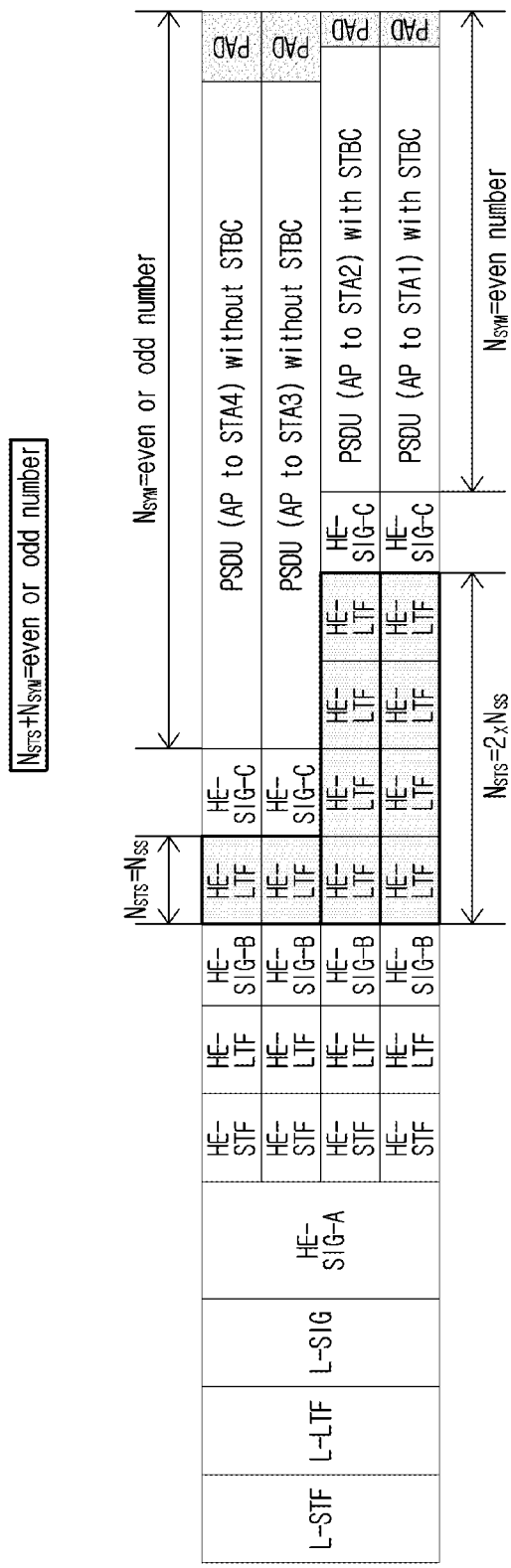
FIG. 16 depicts another exemplary HE PPDU padding according to the present invention.

FIG. 16 depicts another exemplary HE PPDU padding according to the present invention.

Compared to FIGS. 13, 14, and 15 illustrating exemplary cases in which PSDUs are transmitted at the same start timings on a plurality of subchannels (i.e., the lengths of HE-LTF sections are equal across the plurality of subchannels), FIG. 16 illustrates an exemplary case in which PSDUs are transmitted at different start tunings on a plurality of subchannels (i.e., the lengths of HE-LTF sections are different for the plurality of subchannels)

In addition, the example of FIG. 16 is based on the assumption that heterogeneous STBC is applied to a plurality of subchannels in a HE PPDU. For example, data units to which STBC is applied may be transmitted to STA1 and STA2 on subchannels allocated to STA1 and STA2, whereas data units to which STBC is not applied may be transmitted to STA3 and STA4 on subchannels allocated to STA3 and STA4.

In the example of FIG. 16, the numbers $N_{SS}$ of SSs in the data units transmitted to STA1, STA2, STA3, and STA4 are 2, 2, 1, and 1, respectively. When STBC is applied, the number $N_{STS}$ of STSs is $2 \times N_{SS}$ for each STA (or each subchannel). That is, $N_{STS}$ is 4 and 4 respectively for STA1 and STA2. Accordingly, the numbers of HE-LTF elements required for STA1, STA2, STA3, and STA4 are respectively 4 and 4. On the other hand, since STBC is not applied to STA3 and STA4, the numbers of HE-LTF elements required for STA3 and STA4 are 1 and 1, respectively. Accordingly, the numbers of HE-LTF elements required for STA1, STA2, STA3, and STA4 are 4, 4, 1, and 1, respectively.

The example of FIG. 16 is based on the assumption that it is not necessary to align the transmission starting time points of data units transmitted on the plurality of subchannels. Therefore, there is no need for transmitting additional HE-LTF elements on the subchannels allocated to STA3 and STA4.

Therefore, the length of HE-LTF elements (or the HE-LTF symbol duration or the number of HE-LTF OFDM symbols) may be determined to be an even number or an odd number for each of the plurality of subchannels in the HE PPDU.

The length of HE-LTF elements (or the HE-LTF OFDM symbol duration or the number of HE-LTF OFDM symbols) corresponding to $N_{STS}$ is determined to be an even number for a subchannel to which STBC is applied in the HE PPDU. Further, the OFDM symbol duration of a data unit (i.e., a data unit without a padding) is an even number for the subchannel to which STBC is applied in the HE PPDU in view of the STBC property. Also, the length (i.e., $N_{SYM}$) of a data unit added with a padding is also determined so that the OFDM symbol duration or the number of OFSM symbols (i.e., $N_{SYM}$) may be an even number, for the subchannel to which STBC is applied in the HE PPDU. Therefore, an OFDM symbol duration or the number of OFSM symbols corresponding to the sum of $N_{STS}$ and $N_{SYM}$ (i.e., $N_{STS}+N_{SYM}$) is an even number for the subchannel to which STBC is applied in the HE PPDU.

On the other hand, the length of HE-LTF elements (or the HE-LTF OFDM symbol duration or the number of HE-LTF OFDM symbols) corresponding to $N_{STS}$ may be an even number or an odd number for a subchannel to which STBC is not applied in the HE PPDU. Further, the length (i.e., $N_{SYM}$) of a data unit added with a padding is also determined so that the OFDM symbol duration or the number of OFSM symbols (i.e., $N_{SYM}$) may be an even number or an odd number, for the subchannel to which STBC is not applied in the HE PPDU.

Therefore, if STBC is applied to at least one of the plurality of subchannels in the HE PPDU, $N_{STS}+N_{SYM}$ may also be determined so that the OFDM symbol duration (or the number of OFDM symbols) may be an even number, for a subchannel to which STBC is not applied, in order to end transmissions (data transmissions) at the same time point on the plurality of subchannels in the HE PPDU.

That is, although data units to be transmitted on the plurality of subchannels in the HE PPDU may have different lengths in the example of FIG. 16, paddings may be added to end DL/UL MU transmission at the same time on the subchannels allocated to the plurality of STAs in the HE PPDU. For this purpose, a common $N_{STS}+N_{SYM}$ value may be applied to the plurality of subchannels (or the plurality of STAs) in the example of FIG. 16. That is, although the lengths of data units may be different for the plurality of subchannels (or the plurality of STAs), the sums (i.e., $N_{STS}+N_{SYM}$) of HE-LTF lengths and the lengths of PPDU data fields may be set to the same common value for the plurality of subchannels (or the plurality of STAs). That is, one $N_{STS}+N_{SYM}$ value may be applied commonly to the plurality of subchannels (or the plurality of STAs) and may be determined based on the largest sum of the length of a HE-LTF section and the length of a data unit among the data units transmitted on the plurality of subchannels (or for the plurality of STAs).

Also, the sum of the lengths of a HE-LTF section and a data field for a subchannel to which STBC is not applied may be equal to or smaller than the sum of the lengths of a HE-LTF section and a data field for a subchannel to which STBC is applied, in a pre-padding state. Otherwise, the length of the data field for the subchannel to which STBC is applied may be matched to the length of the data field for the subchannel to which STBC is not applied by adding a padding to the data field on the subchannel to which STBC is applied. The length of the data field with the padding on the subchannel to which STBC is applied corresponds to an odd-numbered OFDM symbol duration because it does not match to the STBC property (i.e., the property of coding data across two time resources (i.e., OFDM symbols)).

Inclusion or exclusion of a HE-SIG-B and a HE-SIG-C and the positions of the HE-SIG-B and the HE-SIG-C are not limited in the foregoing various examples of the present invention. For example, if a HE-SIG-B and a HE-SIG-C are included in a HE PPDU frame format, only a HE-LTF following the HE-SIG-B (i.e., a HE-LTF except for a HE-LTF previous to the HE-SIG-B) may be regarded as a HE-LTF used for channel estimation. That is, the length of a HE-LTF section (or a HE-LTF OFDM symbol duration or the number of HE-LTF OFDM symbols) corresponding to $N_{STS}$ may be determined based on only the HE-LTF following the HE-SIG-B in the foregoing embodiments of the present invention. Or if the HE-LTF previous to the HE-SIG-B is also used for channel estimation, the length of the HE-LTF section (or the HE-LTF OFDM symbol duration or the number of HE-LTF OFDM symbols) corresponding to $N_{STS}$ may be determined based on the HE-LTF previous to the HE-SIG-B as well as the HE-LTF following the HE-SIG-B. In a HE PPDU frame format without a HE-SIG-B, there are no HE-LTFs of the HE-SIG-B. Therefore, the length of a HE-LTF section (or the HE-LTF OFDM symbol duration or the number of HE-LTF OFDM symbols) corresponding to $N_{STS}$ may be determined based on a HE-LTF following a HE-STF in the foregoing embodiments of the present invention. According to an embodiment of the present invention, the number of HE-LTF elements used for channel estimation for each of a plurality of subchannels in a HE PPDU format is the number of HE-LTF elements corresponding to $N_{STS}$ in the foregoing embodiments of the present invention.

As described before with reference to the examples of FIGS. 13 to 16, the number of HE-LTF elements transmitted on a plurality of subchannels in a HE PPDU may be determined according to whether STBC is applied to the subchannels. That is, the number of HE-LTF elements may be determined to be an even number for a subchannel to which STBC is applied, whereas the number of HE-LTF elements may be determined to be an even number or an odd number for a subchannel to which STBC is not applied. For example, the number of HE-LTF elements may be 2, 4, or 8 for a subchannel to which STBC is applied, whereas the number of HE-LTF elements may be 1, 2, 4, or 8 for a subchannel to which STBC is not applied. That is, the number of HE-LTF elements may be determined to be a value corresponding to $N_{STS}$ for a subchannel. The number of HE-LTF elements may be determined to be $N_{STS}=2 \times N_{SS}$ ($N_{SS}=1$, 2, or 4) for a subchannel to which STBC is applied, whereas the number of HE-LTF elements may be determined to be $N_{STS}=N_{SS}$ ($N_{SS}=1$, 2, 4, or 8) for a subchannel to which STBC is not applied.

In addition, the numbers of per-subchannel HE-LTF elements may be equal across the plurality of subchannels. In this case, the numbers of HE-LTF elements to be transmitted on one or more other subchannels may be determined according to the number of HE-LTF elements on a subchannel carrying a maximum number of HE-LTF elements depending on whether STBC is applied or not. If STBC is applied to all or none of the plurality of subchannels, the number of HE-LTF elements for a subchannel carrying a maximum number of SSs among the plurality of subchannels may be determined to be equal to the numbers of HE-LTF elements on one or more other subchannels. If STBC may or may not be applied non-uniformly to the plurality of subchannels, the numbers of HE-LTF elements on the plurality of subchannels, which are determined according to whether STBC is applied or not, may be compared and thus the numbers of HE-LTF elements on the other subchannels may be determined to be equal to the number of HE-LTF elements on a subchannel carrying a maximum number of HE-LTF elements. Therefore, the HE-LTF fields may start at the same time point and end at the same time point on the plurality of subchannels in the DL/UL MU PPDU, and the PSDU transmission timings may be aligned between the plurality of subchannels.

While HE-LTF configurations and data unit configurations (e.g., padding application) mainly for a DL MU PPDU, for example, a HE PPDU of the present invention have been described with reference to FIGS. 13 to 16, the present invention is not limited thereto and the same description may be applied to a UL MU PPDU. A trigger frame may indicate the ending time of the UL MU PPDU (or the length of the UL MU PPDU). That is, according to the HE-LTF configurations and data unit configurations (e.g., padding application) of the present invention, transmissions from a plurality of STAs may end at the same time point in the UL MU PPDU.

In addition, transmission parameters (e.g., the number of SSs, an MCS, application or non-application of STBC, etc.) may be applied individually for each of a plurality of data units simultaneously transmitted by the plurality of STAs in UL MU transmission. In other words, different transmission parameters may be applied to the data units simultaneously transmitted by the plurality of STAs. Further, a HE-SIG-A of the HE PPDU may include a common transmission parameter for the plurality of data units simultaneously transmitted by the plurality of STAs. Therefore, unlike a DL MU PPDU, a HE-SIG-A of a UL MU PPDU may not include information about the numbers $N_{SS}$ of SSs transmitted by STAs allocated to a plurality of subchannels.

Accordingly, for UL MU PPDU transmission from a plurality of STAs, an AP may indicate the number of SSs to be applied to a data unit that each of the plurality of STAs transmits on a subchannel allocated to the STA and may regulate that the plurality of STAs should follow scheduling information set by the AP. For this purpose, a trigger frame eliciting UL MU transmission may be used, as described before.

FIG. 17 illustrates an exemplary format of a trigger frame.

As illustrated in FIG. 17, a trigger frame eliciting UL MU transmission may include a Common Info field and a Per-User Info field.

In the Common Info field, a UL MU Duration subfield indicates the transmission time of a UL HE PPDU in which a plurality of STAs perform simultaneous UL transmissions.

A Total LTFs subfield indicates the number of HE-LTF symbols (e.g., the number of HE-LTF elements for each subchannel) included in the UL HE PPDU.

An LTF Duration subfield indicates the duration or length of a HE-LTF symbol (e.g., the duration or length of a HE-LTF element for each subchannel) included in the UL HE PPDU.

A Guard Interval subfield indicates a guard interval applied to the UL HE PPDU.

In the Per-User Info field, an Association Identifier (AID) subfield indicates an ID of an STA participating in the UL MU transmission.

An RU subchannel subfield indicates a subchannel that the STA uses in the UL HE PPDU transmission.

An RU MCS subfield indicates an MCS that the STA uses in the UL HE PPDU transmission.

An RU STS subfield indicates the number of STSs that the STA uses in the UL HE PPDU transmission.

An RU Beamformed subfield provides information about beamforming that the STA applies to the UL HE PPDU transmission.

An RU Coding subfield indicates coding (e.g., BCC or LDPC) that the STA uses in the UL RE PPDU transmission.

An RU Space-Time Block Coding (STBC) subfield indicates whether the STA will use STBC for the UL HE PPDU transmission.

If the RU STBC subfield is included in the Per-User Info field of the trigger frame, heterogeneous STBC UL HE PPDU transmission may be supported, as described before with reference to the foregoing examples of the present invention. Or if the RU STBC subfield is included in the Per-User Info field of the trigger frame, homogeneous STBC UL HE PPDU transmission may be supported, as described before with reference to the foregoing examples of the present invention.

In UL HE PPDU transmission, different transmission parameters may be determined for a UL HE PPDU depending on whether STBC is applied or not. That is, the length of a HE PPDU padding that makes UL MU transmission end at the same time point on a plurality of subchannels (or by a plurality of STAs) may be determined based on the length of the UL HE PPDU (i.e., a UL MU duration), and the length of the UL HE PPDU (i.e., the UL MU duration) may be determined based on whether STBC is applied or not in the present invention.

Specifically, in the UL HE PPDU transmission, if STBC is applied to at least one STA (e.g., the RU STBC subfield of the Per-User Info field in the trigger frame indicates use of STBC), the UL MU duration may be determined based on $N_{SYM}$ calculated by applying 2 as $m_{STBC}$ in [Equation 3] (e.g., by summing the lengths of $N_{SYM}$ and a preamble such as an L-STF, an L-LTF, an L-SIG, a HE-SIG-A, a HE-STF, a HE-LTF, etc.

If the RU STBC subfield of the Per-User Info field in the trigger frame indicates non-use of STBC (i.e., STBC is applied by none of the plurality of STAs), the UL MU duration may be an arbitrary value which is not based on $N_{SYM}$ calculated by applying 2 as $m_{STBC}$, and the UL MU duration of a UL MU PPDU transmitted by the STA may be determined according to a value indicated by the UL MU Duration subfield of the Common Info field of the trigger frame.

If the RU STBC subfield of the Per-User Info field in the trigger frame indicates use of STBC for at least one of the plurality of STAs, the UL MU Duration subfield of the Common Info field of the trigger frame may be set to a value determined based on $N_{SYM}$ calculated by applying 2 as $m_{STBC}$, and the UL MU duration of a UL MU PPDU transmitted by the STA may be determined according to a value indicated by the UL MU Duration subfield of the Common Info field of the trigger frame.

Since the Common Info field of the trigger frame indicates the number of HE-LTF elements and a HE-LTF duration for each of the plurality of subchannels by the Total LTFs subfield and the LTF Duration subfield, the numbers of per-subchannel HE-LTF elements may be equal across the plurality of subchannels.

Figure 18:
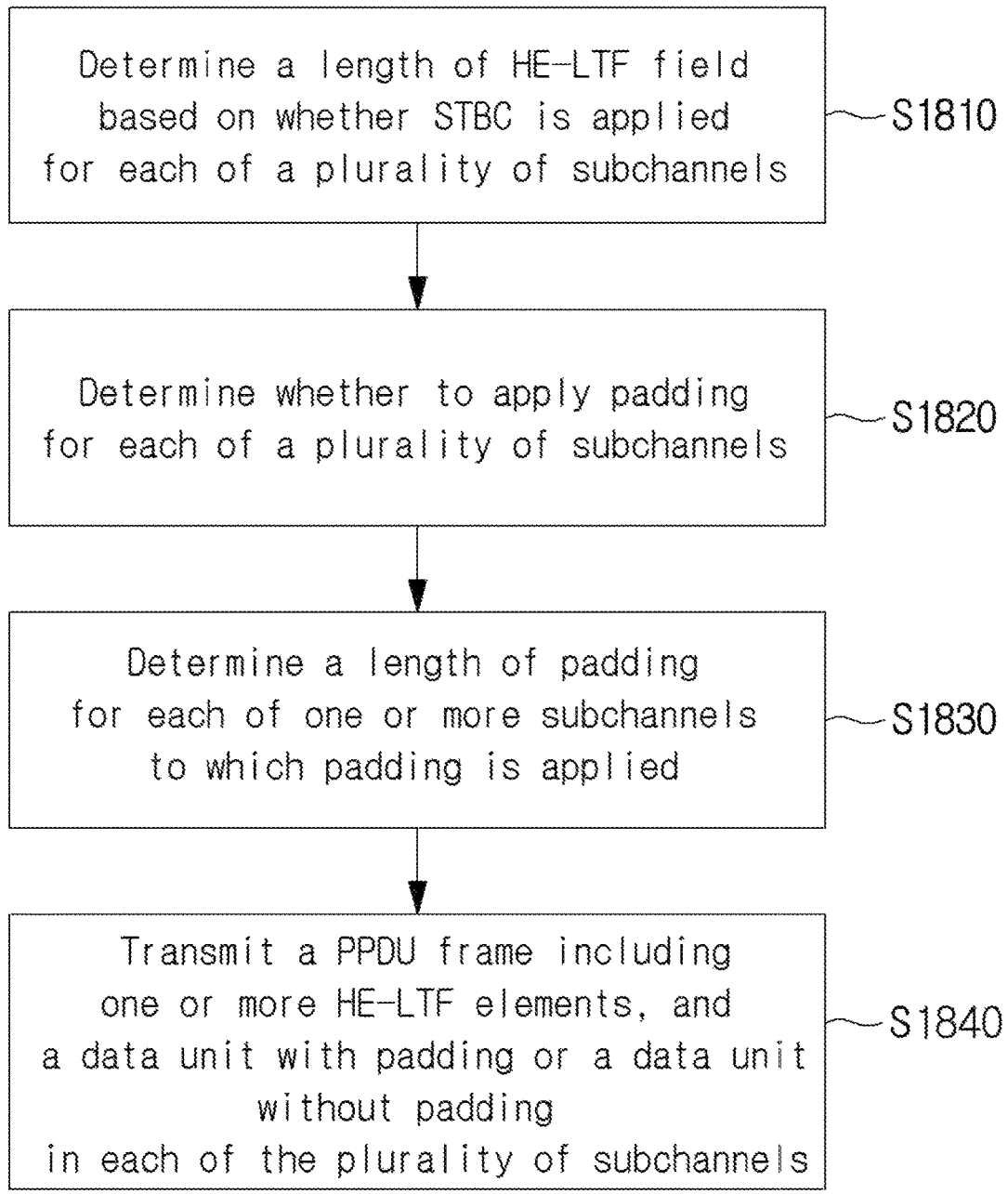
FIG. 18 is a flowchart illustrating an exemplary method according to the present invention.

FIG. 18 is a flowchart illustrating an exemplary method according to the present invention.

In step S1810, an AP may determine the length of a HE-LTF field based on whether STBC is applied or not to each of a plurality of subchannels and determine whether to apply a padding to each of the plurality of subchannels in order to transmit data to a plurality of STAs on a transmission channel divided into the plurality of subchannels.

The HE-LTF field may include one or more HE-LTF elements for each of the plurality of subchannels. The number of HE-LTF elements may be determined to be an even number (e.g., 2, 4, or 8) for a subchannel to which STBC is applied, whereas the number of HE-LTF elements may be determined to be an even number or an odd number (e.g., 1, 2, 4, or 8) for a subchannel to which STBC is not applied. Further, the HE-LTF fields may start at the same time point across the plurality of subchannels, and the HE-LTF fields may end at the same time point across the plurality of subchannels (i.e., the numbers of per-subchannel HE-LTF elements may be equal across the plurality of subchannels).

In step S1820, it may be determined whether to apply a padding to each subchannel based on a common symbol duration (e.g., $N_{SYM}$) applied to the plurality of subchannels and the length of a data unit to be transmitted on the subchannel. For example, it may be determined to apply a padding to a subchannel carrying a shorter data unit than the symbol duration.

In step S1830, the AP may determine a padding length for each of one or more subchannels for which it is determined to apply paddings. A padding length may be determined individually for each subchannel, based on the symbol duration and the length of a data unit to be transmitted on the subchannel. The length of a data unit with a padding may correspond to the symbol duration. On the other hand, it may be said that the length of a padding for a subchannel to which it is determined not to apply a padding is determined to be 0.

In step S1840, the AP may generate a PPDU (e.g., a DL MU PPDU) including as many HE-LTF elements as determined in consideration of STBC application or non-application and the numbers of HE-LTF elements for other subchannels (depending on whether to apply a padding) for each of the plurality of subchannels in step S1810, and a data unit with or without a padding, and may transmit the PPDU to the plurality of STAs on the transmission channel. Or the AP may generate a PPDU (e.g., a DL MU PPDU) including a data unit with a padding (the length of a padding for each subchannel is determined to be a value equal to or larger than 0 according to whether to apply a padding to the subchannel) and may transmit the PPDU to the plurality of STAs on the transmission channel.

While not shown in FIG. 18, upon receipt of the HE PPDU (e.g., DL MU PPDU) frame from the AP, an STA may transmit an ACK a predetermined time (e.g., an SIFS) after the reception time of the frame. According to various embodiments of the present invention, since a padding added individually to each of a plurality of subchannels in a HE PPDU does not correspond to an actual data transmission period (i.e., a time period over which a DL MU PPDU receiver is supposed to receive data) on the subchannel, the STA may generate the ACK by processing (e.g., decoding) data received during a part or whole of a padding period. In this manner, the STA may further secure a time for transmitting the ACK the predetermined time (e.g. SIFS) after receiving the frame by a padding in the HE PPDU.

Figure 19:
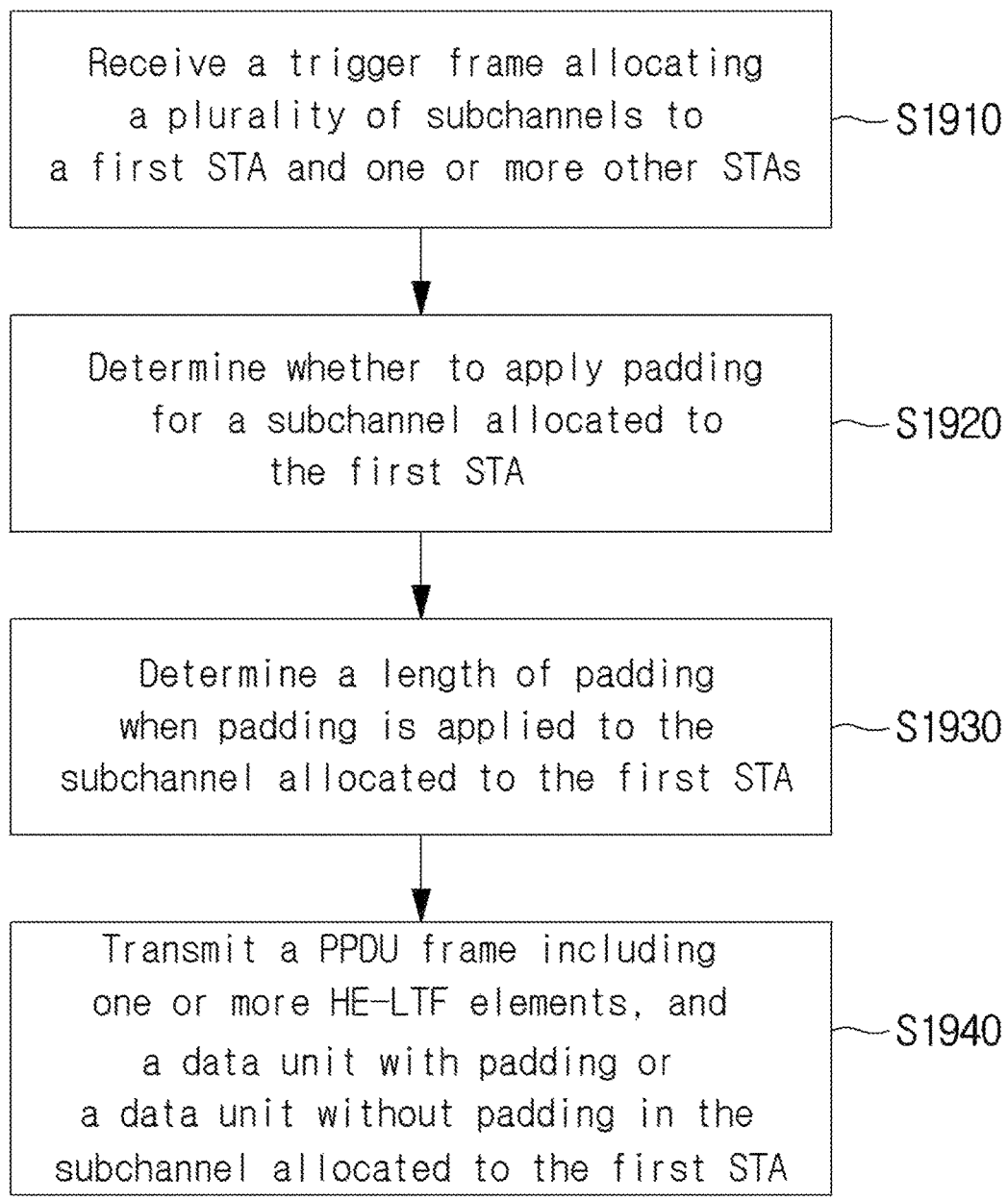
FIG. 19 is a flowchart illustrating another exemplary method according to the present invention.

FIG. 19 is a flowchart illustrating another exemplary method according to the present invention.

In step S1910, a first STA may receive a trigger frame including information required for simultaneous UL transmissions from the first STA and one or more other STAs on a plurality of subchannels (e.g., subchannel allocation information, UL MU transmission scheduling information, information about the lengths of HE-LTF fields, and information about a common symbol duration for the plurality of subchannels). The information about the lengths of HE-LTF fields may be indicated based on whether STBC is applied to each of a plurality of subchannels that are allocated to the first STA and the one or more other STAs. That is, the number of HE-LTF elements for a subchannel to which STBC is applied may be indicated as an even number (e.g., 2, 4, or 8), and the number of HE-LTF elements for a subchannel to which STBC is not applied may be indicated as an even number or an odd number (e.g., 1, 2, 4, or 8). Further, the information about the lengths of HE-LTF fields may indicate a value that makes the HE-LTF fields start at the same time point and end at the same time pint on the plurality of subchannels (i.e., the same number of per-subchannel HE-LTF elements may be indicated for the plurality of subchannels).

In step S1920, the first STA may determine whether to apply a padding to a subchannel allocated to the first STA. The determination may be made based on a symbol duration indicated by the trigger frame and the length of a data unit transmitted on the subchannel allocated to the first STA. For example, if the data unit transmitted on the subchannel allocated to the first STA is shorter than the symbol duration, it may be determined to apply a padding. Or if the length of the data unit transmitted on the subchannel allocated to the first STA is equal to the symbol duration, it may be determined not to apply a padding.

In step S1930, if the first STA determines to apply a padding to the subchannel allocated to the first STA, the length of the padding may be determined. The length of the padding may be determined based on the symbol duration and the length of the data unit transmitted on the subchannel allocated to the first STA. The length of the data unit with the padding may correspond to the symbol duration. Meanwhile, it may be said that the length of the padding is 0 if a padding is not applied to the subchannel allocated to the first STA.

In step S1940, the first STA may generate a PPDU including as many HE-LTF elements as a number indicated for the subchannel allocated to the first STA by the information about the lengths of HE-LTF fields in the trigger frame and a data unit with or without a padding and may transmit the PPDU to the AP. Or the first STA may generate a PPDU including a data unit with a padding on the subchannel allocated to the first STA (i.e., a data unit added with a padding having a length equal to or larger than 0 depending on whether to apply a padding to each subchannel) and may transmit the PPDU to the AP.

While not shown in FIG. 19, upon receipt of the HE PPDU (e.g., the UL MU PPDU) frame from a plurality of STAs, the AP may transmit an ACK a predetermined time (e.g., SIFS) after the reception time of the frame. According to various embodiments of the present invention, since a padding added individually to each of a plurality of subchannels in a HE PPDU does not correspond to an actual data transmission period (i.e., a time period over which a UL MU PPDU receiver is supposed to receive data) on the subchannel, the AP may generate an ACK by processing (e.g., decoding) data received during a part or whole of a padding period. In this manner, the AP may further secure a time for transmitting the ACK the predetermined time (e.g. SIFS) after receiving the frame by a padding in the HE PPDU.

While the exemplary method has been described with reference to FIGS. 18 and 19 as a series of operations for simplicity of description, this does not limit the sequence of steps. When needed, steps may be performed at the same time or in a different sequence. All of the exemplary steps are not always necessary to implement the method according to the present invention.

The foregoing embodiments of the present invention may be implemented independently or one or more of the embodiments may be implemented simultaneously, for the method of FIGS. 18 and 19.

In addition, if an AP transmits a trigger frame including UL MU transmission information for UL HE PPDU transmission to a plurality of STAs, the trigger frame may indicate whether STBC is used or not for each STA to which the UL HE PPDU will be transmitted. For example, the RU STBC subfield of the Per-User Info field may indicate whether a corresponding STA will use STBC for the UL HE PPDU transmission in the example of FIG. 17. The AP may determine whether the STA to transmit the UL HE PPDU will use STBC, taking into account information about the number of SSs supported by the STA (e.g., Supported Spatial Stream information, which may have a value ranging from 1 to 8) and STBC support or non-support information (e.g., Supported STBC information, which may have a value set to one of True and False).

If the Supported Spatial Stream information of the STA to transmit the UL HE PPDU is 1 or the Supported STBC information of the STA is set to False, the AP may indicate that the STA is not supposed to use STBC in the UL HE PPDU by the trigger frame (e.g., the RU STBC subfield). That is, if the Supported Spatial Stream information of the STA to transmit the UL HE PPDU is 2 or larger or the Supported STBC information of the STA is set to True, the AP may indicate that the STA is supposed to use STBC in the UL HE PPDU by the trigger frame (e.g., the RU STBC subfield).

For this purpose, the STA supporting UL MU PPDU transmission may include a Supported Tx Spatial Stream field (e.g., having a value of one of 1 to 8) indicating the number of SSs available for its UL HE PPDU transmission and a Supported Tx STBC field (e.g., set to True or False) indicating whether the STA supports application of STBC for its UL HE PPDU transmission in a specific frame (e.g., an Association Request frame, a Probe Request frame, an Operating Mode Notification frame, etc.) and transmits the frame to the AP.

FIGS. 20, 21, and 22 illustrate exemplary formats of an Operating Mode Notification frame.

An STA may transmit Supported Tx Spatial Stream information to an AP in an Operating Mode Notification frame having the format illustrated in the example of FIG. 20.

In the example of FIG. 20, a Category field may indicate that this frame is a HE action frame and a HE Action field may indicate that this frame is an Operating Mode Notification frame.

An Operating Mode fields for DL or UL field may be configured in the format illustrated in FIG. 21 or FIG. 22. The Operating Mode fields for DL or UL field may be included in the header of a MAC data frame.

The Operating Mode fields for DL or UL field may include subfields that provide information applied to a DL HE PPDU. For example, the Operating Mode fields for DL or UL field may include a 2-bit Channel Width subfield, a 1-bit reserved subfield, a 1-bit Operating Mode Type subfield, a 3-bit Rx Nss subfield, and a 1-bit Rx Nss Type subfield.

The Operating Mode Type subfield may be set to a value indicating application to a DL HE PPDU (e.g., 0). In this case, the Channel Width, Rx Nss, and Rx Nss Type subfields may be defined as illustrated in [Table 3] below.

TABLE 3

| Subfield | Description |
| --- | --- |
| Channel Width | If the Rx NSS Type subfield is 0, indicates the supported channel width that the STA can receive:<br>Set to 0 for 20 MHz<br>Set to 1 for 40 MHz<br>Set to 2 for 80 MHz<br>Set to 3 for 160 MHz or 80 + 80 MHz<br>Reserved if the Rx NSS Type subfield is 1. |
| Rx NSS | If the Rx NSS Type subfield is 0, indicates the maximum number of spatial streams that the STA can receive.<br>If the Rx NSS Type subfield is 1, indicates the maximum number of spatial streams that the STA can receive as a beamformee in an SU PPDU using a beamforming steering matrix derived from a VHT Compressed Beamforming report or an HE Compressed Beamforming report with Feedback Type subfield indicating MU in the corresponding VHT Compressed Beamforming frame or an HE Compressed Beamforming frame sent by the STA.<br>Set to 0 for NSS = 1<br>Set to 1 for NSS = 2<br>. . .<br>Set to 7 for NSS = 8 |
| Rx NSS Type | Set to 0 to indicate that the Rx NSS subfield carries the maximum number of spatial streams that the STA can receive.<br>Set to 1 to indicate that the Rx NSS subfield carries the maximum number of spatial streams that the STA can receive in an SU PPDU using a beamforming steering matrix derived from a VHT Compressed Beamforming report with the Feedback Type subfield indicating MU in the corresponding VHT Compressed Beamforming frame sent by the STA.<br>An AP always sets this field to 0. |

Referring to [Table 3], the Channel Width subfield indicates a supported channel width that an STA may receive, if the Rx Nss Type subfield is 0. If the Channel Width subfield is set to 0, 1, 2, or 3, it may indicate 20 MHz, 40 MHz, 80 MHz, or 160 MHz or 80+80 MHz, respectively. If the Rx Nss Type subfield is 1, the Channel Width subfield may be reserved.

The Rx Nss subfield may indicate the maximum number of SSs that the STA may receive, if the Rx Nss Type subfield is 0. If the Rx Nss Type is 1, the Rx Nss subfield may indicate the maximum number of SSs that the STA may receive as a SU PPDU beamformee (i.e., a beamformed signal receiver) using a beamforming steering matrix derived from a VHT compressed beamforming report or a HE compressed beamforming report. The VHT compressed beamforming report or the HE compressed beamforming report may be included in a VHT compressed beamforming frame or a HE compressed beamforming frame, and a Feedback Type subfield included in the frame may indicate MU. If the Rx Nss subfield is set to 0, 1, 2, 3, 4, 5, 6, or 7, it may indicate 1, 2, 3, 4, 5, 6, 7, or 8 SSs, respectively.

If the Rx Nss Type subfield is 0, the Rx Nss subfield may indicate the maximum number of SSs that the STA may receive. If the Rx Nss Type subfield is 1, it may indicate the maximum number of SSs that the STA may in a SU PPDU using a beamforming steering matrix induced from the VHT compressed beamforming report or the HE compressed beamforming report. The VHT compressed beamforming report or the HE compressed beamforming report may be included in a VHT compressed beamforming frame or a HE compressed beamforming frame, and the Feedback Type subfield included in the frame may indicate MU. The AP may always set the Rx Nss Type subfield to 0.

The Operating Mode Type subfield may be set to a value (e.g., 1) indicating application to a DL HE PPDU. In this case, the Channel Width, Rx Nss, and Rx Nss Type subfields may be defined as illustrated in [Table 4] below.

TABLE 4

| Subfield | Description |
| --- | --- |
| Channel Width | If the Tx NSS Type subfield is 0, indicates the supported channel width that the STA can transmit in UL Multi-User (MU) PPDU (e.g., uplink OFDMA or uplink MU-MIMO):<br>Set to 0 for 20 MHz<br>Set to 1 for 40 MHz<br>Set to 2 for 80 MHz<br>Set to 3 for 160 MHz or 80 + 80 MHz<br>Reserved if the Tx NSS Type subfield is 1. |
| Tx NSS | If the Tx NSS Type subfield is 0, indicates the maximum number of spatial streams that the STA can transmit in UL Multi-User (MU) PPDU (e.g., uplink OFDMA or uplink MU-MIMO).<br>Set to 0 for NSS = 1<br>Set to 1 for NSS = 2<br>. . .<br>Set to 7 for NSS = 8<br>Reserved if the Tx NSS Type subfield is 1. |
| Tx NSS Type | Set to 0 to indicate that the Tx NSS subfield carries the maximum number of spatial streams that the STA can transmit in UL Multi-User (MU) PPDU (e.g., uplink OFDMA or uplink MU-MIMO).<br>Set to 1 to indicate that the STA does not enable UL Multi-User (MU) PPDU (e.g., uplink OFDMA or uplink MU-MIMO) transmission. |

Referring to [Table 4], the Channel Width subfield indicates a supported channel width that an STA may transmit in a UL MU PPDU (e.g., a UL OFDMA PPDU or a UL MU-MIMO PPDU), if the Tx Nss Type subfield is 0. If the Channel Width subfield is set to 0, 1, 2, or 3, it may indicate 20 MHz, 40 MHz, 80 MHz, or 160 MHz or 80+80 MHz, respectively. If the Tx Nss Type subfield is 1, the Channel Width subfield may be reserved.

The Tx Nss subfield may indicate the maximum number of SSs that the STA may transmit in the UL MU PPDU (e.g., the UL OFDMA PPDU or the UL MU-MIMO PPDU), if the Tx Nss Type subfield is 0. If the Tx Nss subfield is set to 0, 1, 2, 3, 4, 5, 6, or 7, it may indicate 1, 2, 3, 4, 5, 6, 7, or 8 SSs, respectively. If the Tx Nss Type subfield is set to 1, the Tx Nss subfield may be reserved.

If the Tx Nss Type subfield is 0, the Tx Nss subfield may indicate the maximum number of SSs that the STA may transmit in the UL MU PPDU (e.g., the UL OFDMA PPDU or the UL MU-MIMO PPDU). If the Rx Nss Type subfield is 1, the Tx Nss subfield may indicate that the STA does not enable transmission of the UL MU PPDU the UL OFDMA PPDU or the UL MU-MIMO PPDU).

In addition to the examples of FIGS. 21 and 22, the Operation Mode fields for DL or UL field may be defined for each of the DL and the UL. In this case, the DL Channel Width and Rx NSS fields may be set to the same values as the UL Channel Width and Tx NSS fields.

As described above, an STA may enable or disable UL MU PPDU transmission dynamically and change the maximum number of receivable/transmittable SSs dynamically, by the Operating Mode Notification frame. In general, the STA may dynamically determine these parameters in consideration of the amount of traffic to be transmitted, an energy consumption, etc.

The present invention includes an apparatus for processing or performing the method according to the present invention (e.g., the wireless device and its components described with reference to FIGS. 1, 2, and 3).

The present invention includes software (an operating system (OS), an application, firmware, a program, etc.) for executing the method according to the present invention in a device or a computer, and a medium storing the software that can be executed in a device or a computer.

While various embodiments of the present invention have been described in the context of an IEEE 802.11 system, they are applicable to various mobile communication systems.

What is claimed is:

1. A method for transmitting data to a plurality of Stations (STAs) on a transmission channel by an Access Point (AP) in a Wireless Local Area Network (WLAN), the transmission channel being divided into a plurality of subchannels allocated to the plurality of STAs, the method comprising:
   generating a High Efficiency-Long Training Field (HE-LTF) having a plurality of HE-LTF symbols;
   determining a space-time-stream sum for each subchannel of the plurality of subchannels by computing a sum of numbers of space-time streams transmitted for all STAs respectively allocated to each subchannel; and
   transmitting, to the plurality of STAs and using the plurality of subchannels, a Physical layer Protocol Data Unit (PPDU) frame, the PPDU frame including the HE-LTF and a plurality of data units for the plurality of STAs,
   wherein a number of the plurality of HE-LTF symbols is equal to or greater than a maximum of the respective space-time-stream sums of the plurality of subchannels.

2. The method according to claim 1, wherein the number of HE-LTF symbols is 2, 4, or 8 when Space Time Block Coding (STBC) is used, and is 1, 2, 4, or 8 when STBC is not used.

3. The method according to claim 1, wherein whether to encode a subchannel using Space Time Block Coding (STBC) is determined individually for each of the plurality of subchannels.

4. The method according to claim 3, wherein the HE-LTF starts at a same start time across the plurality of subchannels and ends at a same end time across the plurality of subchannels.

5. The method according to claim 1, wherein respective starting times of the plurality of data units are determined based on the number of the HE-LTF symbols, and wherein the respective starting times of the plurality of data units are the same across the plurality of subchannels.

6. The method according to claim 1, further comprising generating a padding individually for one or more subchannels to which the padding is applied among the plurality of subchannels, based on a symbol duration commonly applied to the plurality of sub channels.

7. The method according to claim 6, wherein the transmitting the PPDU frame to the plurality of STAs further comprises:
   transmitting the PPDU frame including a data unit without the padding or a data unit with the padding for each of the plurality of subchannels to the plurality of STAs on the transmission channel.

8. The method according to claim 1, wherein a symbol duration is commonly applied to a subchannel encoded using Space Time Block Coding (STBC) and a subchannel not encoded using STBC.

9. The method according to claim 1, wherein when data units for a plurality of STAs are transmitted on one subchannel, Space Time Block Coding (STBC) is not used to encode the one sub channel.

10. The method according to claim 1, wherein the HE-LTF symbols are for performing frequency offset estimation and phase offset estimation, and wherein respective Physical layer Data Service Units (PSDUs) transmitted on the plurality of subchannels of are aligned by the HE-LTF symbols so as to begin at a same time.

11. A method for transmitting data to an Access Point (AP) by a Station (STA) in a Wireless Local Area Network (WLAN), the method comprising:
   receiving a trigger frame from the AP, the trigger frame allocating a plurality of subchannels to the STA and one or more other STAs and including information about a number of a High Efficiency-Long Training Field (HE-LTF) symbols to be included in a response frame to the trigger frame; and
   transmitting, in response to the trigger frame, to the AP on a subchannel allocated to the STA from among the plurality of subchannels, an uplink frame, the uplink frame including a data unit and as many HE-LTF symbols as indicated by the information about the number of the HE-LTF symbols,
   wherein the number of HE-LTF symbols to be included in the response frame is determined by:
      determining a space-time-stream sum for each subchannel of the plurality of subchannels by computing a sum of numbers of space-time streams transmitted for all STAs respectively allocated to each subchannel, and
      determining the number of the plurality of HE-LTF symbols as equal to or greater than a maximum of the respective space-time-stream sums of the plurality of subchannels.

12. The method according to claim 11, wherein the number of HE-LTF symbols is 2, 4, or 8 when Space Time Block Coding (STBC) is used, and is 1, 2, 4, or 8 when STBC is not used.

13. The method according to claim 11, wherein whether Space Time Block Coding (STBC) is used to encode a subchannel is determined individually for each of the plurality of subchannels.

14. The method according to claim 13, wherein the HE-LTF starts at a same start time across the plurality of subchannels and ends at a same end time point across the plurality of subchannels.

15. The method according to claim 11, wherein a starting time of a data unit transmitted from the STA on the subchannel allocated to the STA and starting times of one or more other data units transmitted from one or more other STAs on one or more other subchannels allocated to the one or more other STAs are determined based on the number of the HE-LTF symbols, and wherein the starting time of the data unit transmitted from the STA on the subchannel allocated to the STA, and the starting times of the one or more other data units transmitted from the one or more other STAs on the one or more other subchannels allocated to the one or more other STAs are equal across the plurality of subchannels.

16. The method according to claim 11, wherein the trigger frame further includes information about a symbol duration commonly applied to the plurality of subchannels, and the method further comprising:

when the padding is applied to the subchannel allocated to the STA, generating a padding based on the symbol duration.

17. The method according to claim 16, wherein the transmitting the uplink frame to the AP comprises:

transmitting the uplink frame including a data unit without the padding or a data unit with the padding to the AP on the subchannel allocated to the STA.

18. The method according to claim 11, wherein a symbol duration is identically applied to the subchannel allocated to the STA, for both cases when Space Time Block Coding (STBC) is used to encode the subchannel allocated to the STA and when STBC is not used to encode the subchannel allocated to the STA.

19. The method according to claim 11, wherein the HE-LTF symbols are for performing frequency offset estimation and phase offset estimation, and wherein respective Physical layer Data Service Units (PSDUs) of the plurality of subchannels are aligned by the HE-LTF symbols so as to begin at a same time.

\* \* \* \* \*